(12) United States Patent
Brazeau

(10) Patent No.: US 10,192,195 B1
(45) Date of Patent: Jan. 29, 2019

(54) TECHNIQUES FOR COORDINATING INDEPENDENT OBJECTS WITH OCCLUSIONS

(71) Applicant: Amazon Technologies, Inc., Seattle, WA (US)

(72) Inventor: Jeremiah David Brazeau, Hudson, NH (US)

(73) Assignee: Amazon Technologies, Inc., Seattle, WA (US)

(*) Notice: Subject to any disclaimer, the term of this patent is extended or adjusted under 35 U.S.C. 154(b) by 40 days.

(21) Appl. No.: 15/334,062

(22) Filed: Oct. 25, 2016

(51) Int. Cl.
| | |
|---|---|
| *G06F 7/00* | (2006.01) |
| *G06F 19/00* | (2018.01) |
| *G06Q 10/08* | (2012.01) |
| *B25J 9/16* | (2006.01) |
| *B25J 9/00* | (2006.01) |
| *G06Q 10/06* | (2012.01) |
| *B65G 1/137* | (2006.01) |

(52) U.S. Cl.
CPC .......... *G06Q 10/087* (2013.01); *B25J 9/0084* (2013.01); *B25J 9/1661* (2013.01); *B25J 9/1666* (2013.01); *B25J 9/1697* (2013.01); *B65G 1/137* (2013.01); *G06Q 10/06311* (2013.01)

(58) Field of Classification Search
None
See application file for complete search history.

(56) References Cited

U.S. PATENT DOCUMENTS

| | | | |
|---|---|---|---|
| 8,280,547 B2 | 10/2012 | D'Andrea et al. | |
| 9,087,314 B2 | 7/2015 | Hoffman et al. | |
| 2011/0054688 A1* | 3/2011 | Ortmaier | A61B 6/102 700/255 |

\* cited by examiner

*Primary Examiner* — Yolanda R Cumbess
(74) *Attorney, Agent, or Firm* — Kilpatrick Townsend & Stockton LLP

(57) ABSTRACT

Systems and methods are provided herein for coordinating motion between components of an inventory system. A first set of instructions associated with a first task to be performed by a first robotic device may be received. A second set of instructions associated with a second task to be performed by a second robotic device may be received. The first and second robotic devices may be configured to utilize corresponding operational areas that may overlap to define an area of overlap. Light information representative of the spatial condition of at least one of the robotic devices may be projected onto a projection surface. The light information may be utilized to determine that at least one of the first and second robotic devices is utilizing the area of overlap. A remedial action may be performed to coordinate motion of the first and second robotic devices within the area of overlap.

20 Claims, 12 Drawing Sheets

TECHNIQUES FOR COORDINATING INDEPENDENT OBJECTS WITH OCCLUSIONS

BACKGROUND

Modern inventory systems, such as those in storage facilities (e.g., a warehouse) operated by electronic marketplace providers, face significant challenges with respect to managing items in inventory. Current systems may lack effective resolution methods for overcoming these contentions.

For example, it may be the case that two robotic arms are utilizing an operational overlap area in the course of performing their respective tasks. For example, a robotic arm may need to utilize a space in a storage facility to place and/or retrieve an item, while another robotic arm may need to utilize the space for a similar and/or different purpose. This may cause the robotic arms to compete for that space. Additionally, it may be the case that at least one robotic arm may be unable to view the movements of the other robotic arm.

In conventional systems, a robotic device may determine that a space should be utilized for performing a task but that the space is being utilized by another device (e.g., via line of sight observance). These systems often require the robotic device to wait some period of time before attempting to utilize the contended space again. This approach may impact the throughput of the storage facility. Accordingly, current techniques may lead to delays in task completion that may affect the performance of the robotic devices operating in the storage facility individually, or as a whole. Embodiments of the invention address these and other problems, individually and collectively.

BRIEF DESCRIPTION OF THE DRAWINGS

Various embodiments in accordance with the present disclosure will be described with reference to the drawings, in which.

DETAILED DESCRIPTION

Figure 1:
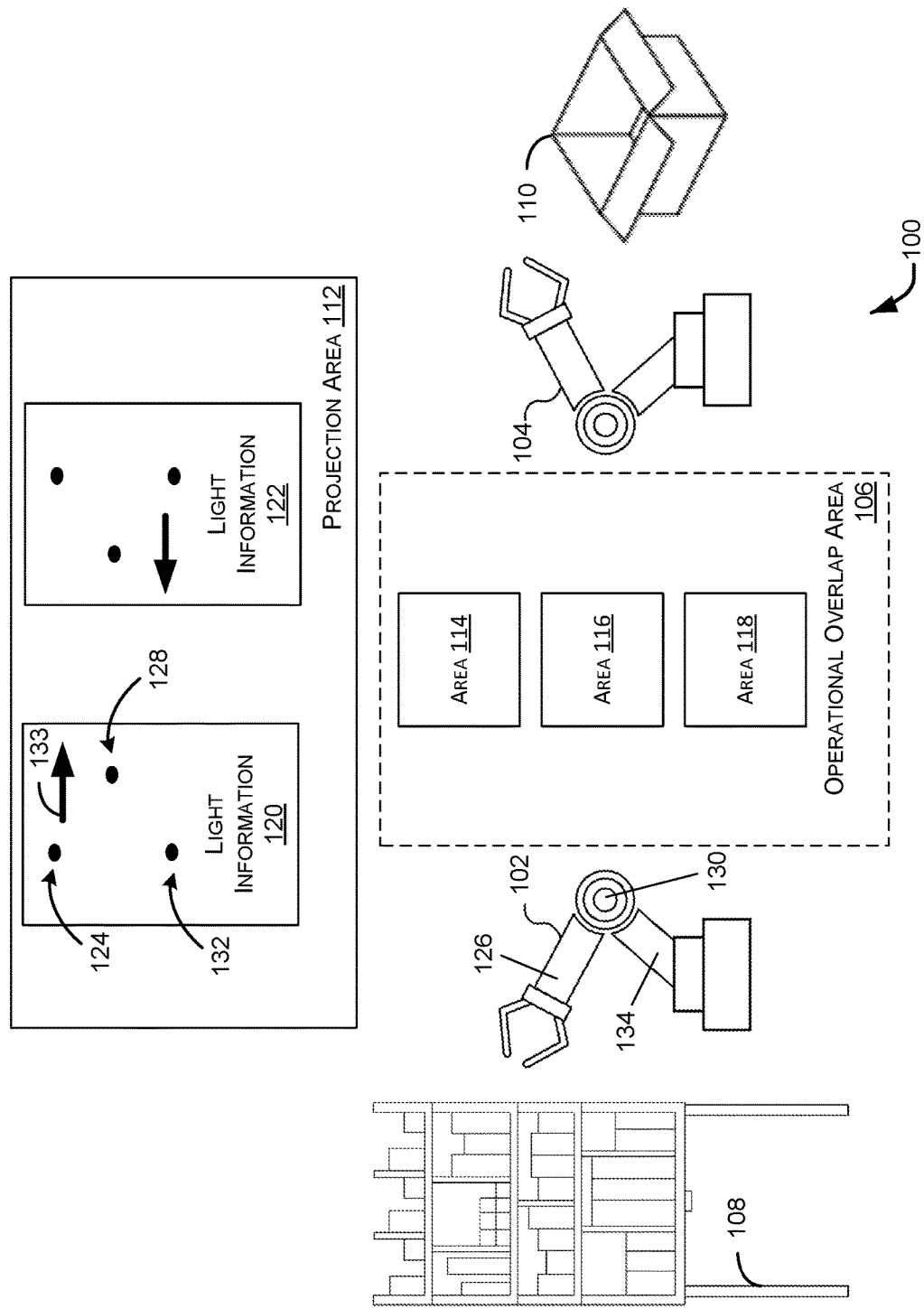
FIG. 1 is a schematic diagram illustrating an example environment suitable for implementing aspects of a robotic device management module, in accordance with at least one embodiment.

Techniques described herein are directed to systems and method for coordinating motion between robotic components of an inventory system. Although examples throughout may utilize warehouses and/or warehouse machinery for illustrative purposes, it should be appreciated that any example herein may be equally applied to other suitable contexts. As used herein, a "contention" is intended to refer situations in which two or more robotic devices (e.g., a robotic arm) are individually required to utilize a common space (e.g., an operational overlap area) to complete a respective task. Although examples herein utilize robotic arms, it should be appreciated the systems and methods provided herein may be equally applied to examples including any suitable robotic devices (e.g., mobile drive units, etc.) and that any suitable number of such devices may be utilized. It should be appreciated that any functionality described with respect to a "centralized management module," a "distributed management module," or a "management module" may be performed in a centralized server computer or as components operating on one or more components (e.g., robotic devices) of an inventory system.

In at least one embodiment, a management module of an inventory system may be responsible for determining tasks and assigning individual tasks to individual robotic devices in a storage facility operated by, or on behalf of an electronic marketplace provider (e.g., an online retailer of physical items). For example, the management module may determine that an item (e.g., a single item, a pallet, a cart, or any suitable container that stores one or more items) is to be moved from a first location (e.g., a storage area) to a second location (e.g., a packaging station within the storage facility). The management module may determine that particular robotic devices (e.g., mobile drive units) should provide the item to the second location (e.g., the packaging station). Additionally, or alternatively, the management module may determine one or more robotic devices (e.g., robotic arms) at the second location (e.g., the packaging station) should be utilized to perform an additional task (e.g., packaging the item in a shipping container).

As a non-limiting example, the management module may determine two particular robotic devices should be utilized to ready an item for shipment. For example, two robotic arms may be associated with a station within the storage facility where items are packed for shipping. In some examples, the particular station may be selected for packaging an item based at least in part on current workload considerations (e.g., available space/bandwidth to package said item). The item may be provided (e.g., via a storage container such as a cart, pod, shelving unit, or the like) to a location corresponding to the first robotic arm. In some examples, the first robotic arm may retrieve the item from a storage container (or the storage container itself containing the item) and may place the item (or storage container containing the item) in an area (e.g., a picking area) within reach of a second robotic arm. At a suitable time, the second robotic arm may retrieve the item from the area/storage container and move the item to another location (e.g., a shipping container).

In at least one embodiment, the robotic arms being utilized to perform such functions may be incapable of determining the location/motion of the other robotic arm at various times during task execution. For example, there may be an object (e.g., a box, a wall, another device, etc.) that obscures the view of one robotic arm by the other robotic arm. Accordingly, upon receipt of a set of instructions from the management module, or at another suitable time, a robotic arm may be instructed to project or otherwise provide light information (e.g., a picture, a pattern including a group of lighted points/shapes, a pictorial representation of a motion vector, etc.) utilizing a surface of the storage area (e.g., a projection area such as a projection screen, a wall, a ceiling, a floor, etc.) within the storage facility. In some cases, the light information may be provided by one or more light emitters of the robotic device (herein referred to as the "projecting" device). The other robotic arm (herein referred to as the "receiving device") may utilize the light information to perform various calculations in order to compute current and/or planned motion information (e.g., current and/or planned location(s), orientation(s), movement(s), direction(s)/heading(s), speed(s), acceleration(s), distance(s) from a reference point such as a projection area, kinematic information, or the like) of the projecting device even though the receiving device may not be able to directly view (e.g., via a camera or other sensor of the receiving device) the actions of the projecting device.

In at least one embodiment, the light information may include embedded motion information such as a planned direction, speed, acceleration, or the like. As a non-limiting example, the projecting device may project light information (e.g., a pictorial representation of a motion vector) such as a line, an arrow, a pattern of dots, or the like to indicate a planned direction, speed, acceleration, and/or location of the projecting device. In some examples, the light information may include different elements (e.g., dots, lines, arrows, etc.) that are depicted using different types/colors of light. Thus, in some examples, the color(s) associated with the light information may indicate data pertaining to current and/or planned direction, speed, acceleration, location, orientation, or the like. Accordingly, the light information may be utilized by the receiving device to receive and/or calculate current and/or planned motion information of the projecting device.

In at least one embodiment, a group of robotic devices may each project light information such that the other robotic devices are able to compute (or otherwise ascertain) motion information corresponding to the other robotic devices in the group. By utilizing the light information provided by other robotic devices in accordance with the various examples described herein, a robotic device is enabled to ascertain situational awareness without needing direct line of sight of other robotic devices. Utilizing the light information allows the robotic device to perform a myriad of remedial actions including, but not limited to, waiting to utilize an area until another device has vacated the area, requesting resolution instructions from the management module (e.g., a management module of a remote to the robotic device), continuing to execute the assigned task as planned, modifying a received set of instructions for task execution, or the like. Such remedial actions may be determined based on the motion information of the other robotic device. Accordingly, examples herein enable robotic devices having an operational overlap area of a storage facility to avoid collisions with one another as well as to generally avoid contentions for the operational overlap area.

In accordance with at least one embodiment, the management module may determine that particular robotic devices (e.g., two or more robotic devices) should coordinate together to achieve a common task (e.g., simultaneously moving an object). As a non-limiting example, the management module may determine that two robotic devices may be simultaneously utilized to move a heavy and/or awkwardly shaped item. It may be the case that while the two robotic devices attempt to move the item, they are each incapable of viewing/ascertaining the other's motions directly (e.g., utilizing a camera and/or a sensor of the robotic devices). For example, the item may be a large box that, when lifted by the robotic arms, obscures the view of each of the robotic arms from the other robotic arm. Upon receipt of instructions to perform the task, or at another suitable time, one or both of the robotic arms may be instructed to provide light information utilizing one or more light emitters of each respective device and a projection area of the storage facility. By way of example, the robotic devices may be instructed to utilize a particular location of the floor, the ceiling, a wall of the storage facility that is visible to each robot. Additionally, or alternatively, any suitable robotic device (or a component of the robotic device) may be utilized to determine a suitable location to provide light information to another robotic device.

It is contemplated that in any of the examples provided herein, the light information provided utilizing a projection area of the storage facility may include one or more light points. By way of example, a light point may correspond to a particular location (e.g., a joint, a forearm, a particular location of a particular portion, etc.) of the robotic device at which a light emitter is affixed. In some cases, the light points may correspond to a specification associated with a particular robotic device (e.g., a particular robotic arm, a particular type of robotic arm/device, etc.). A specification may indicate an expected layout of the light point(s) such that particular light points may be identified as being associated with particular locations and/or portions of the projecting device. The light points may be any suitable shape. In some cases, the light points may differ from one another with respect to at least one attribute of the light point. For example, the light points may differ from one another with respect to size, shape, color, fill pattern, or any suitable attribute that may be associated with light provided on a light-receiving surface (e.g., a wall, a ceiling, a portion of a floor, a screen, etc.).

It is further contemplated that in any of the examples provided herein, the light information provided utilizing any suitable projection area of the storage facility may include one or more motion vectors. A motion vector may indicate any suitable combination of current and/or planned direction, speed, acceleration, location, orientation, etc. of the projecting device. For example, an arrow may be utilized as a motion vector where the arrow may point in a planned direction of the projecting device. In some examples, the length and/or width of the tail of the arrow may indicate a planned speed and/or an acceleration of the projecting device. The motion vector may be colorized to indicate motion information. For example, the motion vector may be colorized to indicate a planned/current speed, acceleration, etc. The motion vector may additionally, or alternatively, indicate a time component. For example, a color, shape, text, or the like may be included with/in the motion vector to indicate that the indicated motion information (e.g., speed, direction, acceleration, etc.) is planned for a particular time (e.g., in 5 seconds, in one minute, etc.). In still further examples, the projecting device may provide light information that indicates both current and planned motion information. For example, a set of light points of one color may indicate current motion information while another set of light points of a different color may indicate planned motion information. Although examples herein include an arrow to depict a motion vector, various shapes, lines, colors, lengths, widths, etc. may equally be utilized as a motion vector.

It should be appreciated that the techniques discussed above are applicable in contexts other that inventory situations. The techniques disclosed herein provide, at least, a system and method for resolving contentions for space between multiple robotic devices within a storage facility. In contrast to conventional techniques that require robotic devices to wait some period of time before attempting to again access a previously-contended space, the techniques described herein allow for these periods of time to be reduced and/or eliminated. For example, a robotic device may be instructed to wait until another robotic device vacates a contended space instead of waiting some determined period of time that does not factor in whether the space has become available again. Utilizing the techniques discussed herein, the inventory system may operate more efficiently with respect to the various components (e.g., robotic devices) operating within a storage facility as task completion delays may be reduced by providing robotic devices the means to determine the current and/or planned actions/behavior (e.g., motion information) of other robotic devices for which direct visual input is unattainable.

FIG. 1 is a schematic diagram illustrating an example environment 100 suitable for implementing aspects of a robotic device management module, in accordance with at least one embodiment. In accordance with at least one embodiment, the robotic device management module may operate as a component of a robotic device (or as a component of a centralized system) and may be configured to communicate with a management module responsible for coordinating various tasks within a storage facility. In at least one example, robotic device 102 (e.g., a robotic arm) and robotic device 104 (e.g., another robotic arm) may execute various functions (e.g., placing an object, retrieving an object, moving an object within an area, etc.) within an operational overlap area 106 (e.g., a table, an area, a conveyor belt, or the like). An object, as used herein, may include a single items, a set of items, one or more items on a tray and/or another suitable container. As a non-limiting example, the robotic device 102 may be tasked (e.g., by a management module of an inventory system) with removing an item or items from storage container 108 and placing the items within the operational overlap area 106. Similarly, the robotic device 104 may be tasked with retrieving an item or items from the operational overlap area 106 and placing the item in a shipping container 110. The item and/or the shipping container may be selected and/or determined based on traditional methods of order fulfillment within such inventory systems.

In accordance with at least one embodiment, the robotic device 102 and/or the robotic device 104 (or a component of the robotic devices such as corresponding robotic device management modules) may individually receive a set of instructions indicating one or more actions to perform that are associated with a given task. Upon receipt of the instructions, upon determining that another robotic device is in close proximity to the operational overlap area 106, or at another suitable time, one or both of the robotic devices may be instructed (e.g., by a management module) or may determine independently (e.g., by a robotic device management module) that light information is to be provided. Accordingly, the robotic device management module of one or both of the robotic devices may identify a projection area 112. The projection area 112 may include any suitable surface that is capable of displaying light being produced from one or more emitters of a robotic device. As a non-limiting example, the projection area 112 may be a wall located within a threshold distance of a robotic device and that is viewable (e.g., utilizing a camera of the robotic device) from the locations of the respective robotic devices. In some examples, the set of instructions (e.g., the instructions specifying task identification/execution) may identify a particular location and/or a surface within the storage facility for the robotic device 102 and/or the robotic device 104 to provide light information. In some examples, an identification of the projection area 112 may be provided separate from the set of instructions (e.g., in response to request to the management module by a robotic device, in response to determining, by the management module and/or the robotic device management module that a robotic device will and/or will likely contend for space with respect to another robotic device, etc.). In still further examples, the location of the projection area 112 may be determined by the robotic device 102 (e.g., utilizing a camera) and communicated over one or more data networks to the management module and/or directly to the other robotic devices (e.g., the robotic device 104).

In at least one embodiment, the management module of the inventory system, and/or a robotic device management module operating on robotic device, may stimulate the robotic device 102 to begin projecting light information (e.g., utilizing one or more light emitters of the robotic device 102). In some examples, the robotic device 102 may locate (e.g., utilizing a camera or other sensor) an appropriate projection area (e.g., the projection area 112 as specified by the management module and/or as determined by the robotic device management module) and provide light information 120 that includes three light points (e.g., utilizing multiple light emitters place on various portions of the robotic device 102). Similarly, the robotic device 104 may provide light information 122 that also includes three (different) light points. It should be appreciated that each of the light information provided by the robotic devices may contain more or fewer light points that the number depicted in FIG. 1. Additionally, it should be appreciated that light points may differ from at least one other light point of the projecting device with respect to at least one attribute of the light. For example, one light point may be provided in red, one in blue, and one in green, but each point is a similar shape (e.g., a circle). Similarly, one light point may be shaped as a square, one a circle, and one a triangle. These examples are illustrative only, as many variations and number of light points may be utilized.

In at least one embodiment, the robotic device 102 may be instructed or otherwise stimulated to identify light information being provided by the robotic device 104. For example, a management module may access data (e.g., storage facility configuration information) indicating that the robotic device 102 and the robotic device 104 are incapable of directly viewing the actions of each other. It may be the case that only one robotic device is incapable of directly viewing the action of the other robotic device. In at least some examples, a component of the robotic device 102 (e.g., the robotic device management module) may determine that a view of the robotic device 104 is, at least at times, unattainable. The robotic device 102 may be configured to access a specification associated with the robotic device 104. In some cases, upon identifying that the robotic device 102 and the robotic device 104 may contend for portions of the operational overlap area 106 (e.g., based at least in part on the individual tasks assigned to each robotic device), a management module may provide the specification and/or identification of the specification for the robotic device 104 to the robotic device 102, and/or vice versa. In at least some cases, the robotic device management module may request a specification from the management module and/or the robotic devices may identify locally/remotely-stored specification(s) for robotic device(s). For example, the robotic device 102 may visually or otherwise detect the presence of 104 although visual perception may be hindered (e.g., objects intermittently/continuously obstruct the view of the robotic device 104 from the robotic device 102). In response to determining that visual input/perception is hindered, the robotic device 102 may request a specification that is associated with the robotic device 104 from the management module.

By way of example only, the specification of the robotic device 102 may indicate that certain light information corresponds to certain portions of the robotic device 102. For instance, the specification for the robotic device 102 may specify that the light point 124 may correspond to a location 126 of the robotic device 102. Similarly, light point 128 may be indicated within the specification as being associated with the location 130 of the robotic device 102 and light point 132 may be indicated as being associated with the location 134 of the robotic device 102. In at least one example, the robotic device 102 may further provide motion vector 133 as a part of light information 120. In the example depicted in FIG. 1, the motion vector 133 may indicate that the current and/or planned direction, speed, acceleration, location, orientation, etc. of the robotic device 102. As a non-limiting example, the motion vector 133 may indicate the planned direction (e.g., right toward the operational overlap area 106) of the robotic device 102. The motion vector 133 may further indicate (e.g., by the width of the arrow) a current and/or planned speed. Additionally, or alternatively, the motion vector 133 may further indicate (e.g., by the length of the tail of the arrow) a current and/or planned acceleration of the robotic device 102. Still further, the motion vector 133 may be colorized (e.g., red, blue, green) where the colorization indicates a time component such as the planned motion corresponds to a particular time (e.g., in 5 seconds, in 1 minute, etc.). The light information 122 may similarly correspond to locations on the robotic device 104. It should be appreciated that the robotic devices depicted in FIG. 1 may not necessarily be the same type of device (e.g., different types of robotic arms, one or more robotic devices that are not configured with robotic arms, etc.). Similarly, the specifications (and accordingly, the light information 120 and the light information 122) corresponding to the robotic device 102 and the robotic device 104 may differ based on a type associated with the robotic device, the particular robotic device, or the like.

In accordance with at least one embodiment, the light information 120 of the robotic device 102 may be received/obtained and processed by the robotic device 104 (and/or forwarded to the management module for processing/analysis) and motion information (e.g., a current and/or planned speed, acceleration, direction, location, movement, orientation, etc.) for the robotic device 102 may be determined and/or computed (e.g., by a component of the robotic device 104, by the management module, etc.). The motion information corresponding to the robotic device 102 may provide data that indicates the current behavior of the robotic device 102 in near real time. Additionally, or alternatively, the motion information corresponding to the robotic device 102 may provide data that indicates the planned behavior of the robotic device 102 in near real time. As a non-limiting example, the robotic device 104, utilizing the light information 120, may determine that the robotic device 102 is currently manipulating (or planning to manipulate) an object into the area 114 (e.g., placing a tray of items in the area 114). Accordingly, the robotic device 104 (or a component of the robotic device 104, the management module, etc.) may determine that the area 114 should be avoided and may instead perform tasks associated with area 116. In some examples, the robotic device (or a component of the robotic device, and/or the management module, etc.) may modify the set of instructions provided to the robotic device 104 in order to redirect the actions of the robotic device in light of the actions of the robotic device 102. Similarly, as the robotic device 104 is accessing the area 116, the robotic device 102 may perform other tasks (e.g., placing/removing a tray from another area other than the area 116). By utilizing such techniques, each robotic device may individually perform tasks at its own pace while minimizing the likelihood that its actions, both current and/or planned, hinder the actions of another robotic device.

In accordance with at least one embodiment, the robotic device 102 and the robotic device 104 may operate in a peer-to-peer environment. In such an environment, it may be the case that the robotic device 102 may exchange information directly with the robotic device 104 via one or more data networks of the inventory system. In at least one embodiment, the robotic device 102 may utilize projected light information to communicate various information to the robotic device 104 related to identifying a specification, identifying a point of reference within the projection area 112, signaling the robotic device 104 to modify its current behavior (e.g., halt, slow down, etc.), synchronizing task execution, or the like.

Figure 2:
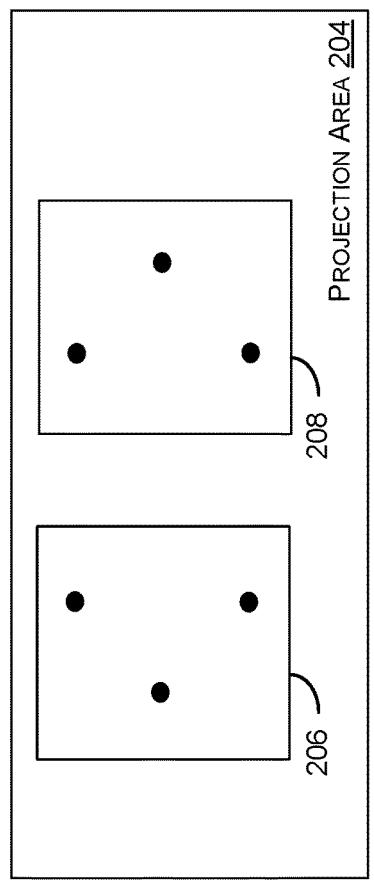
FIG. 2 is a schematic diagram illustrating another example environment suitable for implementing aspects of a robotic device management module, in accordance with at least one embodiment.
Figure 2:
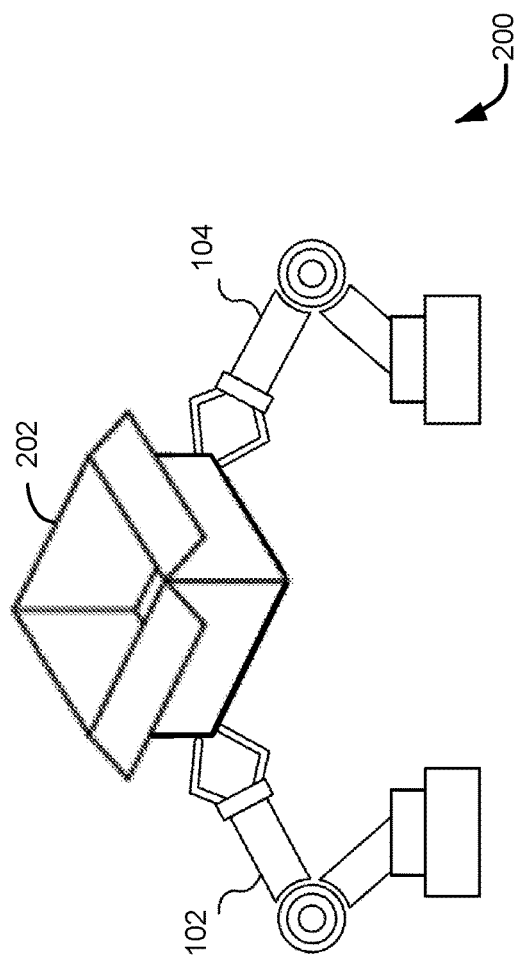

FIG. 2 is a schematic diagram illustrating another example environment 200 suitable for implementing aspects of a robotic device management module, in accordance with at least one embodiment. It should be appreciated, the robotic device 102 and the robotic device 104 of FIG. 2 may be the same or different robotic devices described with respect to FIG. 1. In the example depicted in FIG. 2, the robotic device 102 and the robotic device 104 may be tasked to perform a common task. As a non-limiting example, the robotic device 102 and the robotic device 104 may be instructed to lift and/or move an object 202. Although the object 202 is depicted as a box, any suitable object may be equally applied to the example.

In accordance with at least one embodiment, the robotic device 102 and the robotic device 104 (hereafter referred to as the robotic devices) may receive a set of instructions from, for example, a management module of an inventory system. By way of example, the set of instructions may indicate that the robotic device 102 is to lift a first portion of the object 202 and the robotic device 104 is to lift a second portion of the object 202. As described above in connection with FIG. 1, the actions of the robotic devices may be synchronized and/or initiated by the management module and/or a robotic device management module of the inventory system. Either, or both, the management module and the robotic device management module may be provided by a centralized system and/or as a component of the individual robotic devices.

Upon initiating task execution, or at another suitable time, one or both of the robotic devices may provide light information utilizing the projection area 204 (e.g., the projection area 112 of FIG. 1). The selection of the projection area 204 may be performed by the management module and/or the robotic device management module, either module operating in a centralized system or as a component of the robotic devices) and identification of the projection area 204 may be provided to the robotic devices (e.g., within a set of instructions for task assignment/execution or communicated separately from the set of instructions). Each robotic device may utilize one or more onboard sensors to identify the projection area 204 in physical space. For example, a location sensor may be utilized to determine a current location of the robotic device 102. The location may be compared with a location identified for the projection area 204 within a storage facility. Accordingly, a camera (and/or other suitable sensor) of the robotic device 102 may be utilized to detect the projection area 204 (e.g., a wall associated with the location of the identified projection area) utilizing the identified location. In at least one example, the robotic device 102 may need to travel some distance within the storage facility in order to position itself to enable detection of the projection area 204.

In at least one embodiment, once suitably positioned and upon detecting the projection area 204, the robotic devices may be instructed or otherwise stimulated to provide light information 206 and 208. As depicted in FIG. 2, light information 206 is intended to depict light emitted by a component of the robotic device 102 (e.g., one or more light emitters) while light information 208 is intended to depict light emitted by a component of the robotic device 102 (e.g., one or more different light emitters). The light information 206 may conform to a specification (e.g., an expected layout of light information) associated with the robotic device 102. Similarly the light information 208 may conform to a specification associated with the robotic device 104.

In some examples, the light information 206 and/or the light information 208 may additionally or alternatively be utilized to synchronize task performance by the robotic devices. For example, the light information may be utilized to indicate a time at which the task is to be commenced. As a non-limiting example, the robotic device 102 may provide series of light bursts, or a particular pattern of light points, that may be interpreted by the robotic device 104 to indicate a start time of task performance. By way of example, the robotic device 102 may utilize a single or multiple blinking lights to indicate a countdown (e.g., a countdown from 5, from 10, etc.). In other embodiments, the management module may communicate with the robotic devices to signal task commencement.

In accordance with at least one embodiment, the robotic devices may lift the object 202 according to the assigned task. As the object 202 is moved, each robotic device may monitor the light information provided by the opposing device. Accordingly, although the object may hinder the ability of each robotic device to directly view the actions of the other, each robotic device may utilize the light information to compute motion information for the other robotic device. As a non-limiting example, the robotic device 104 may sense motion of the object 202 that is contradictory to the motion information computed for the robotic device 102. That is to say, that the robotic device 104 (or a component of the robotic device 104) may detect (e.g., utilizing any suitable sensor of the robotic device 104) that the object 202 is slipping, shifting, falling, or otherwise moving contrary to the actions of the robotic device 102. Accordingly, the robotic device 104 may be instructed, or otherwise stimulated to modify its actions in order to compensate. In at least one embodiment, a component of the robotic device (e.g., the robotic device management module) or the management module of the inventory system may calculate an expected path of the object 202 and provide such information to the robotic device 104. Upon detection that the object is deviating from the expected path, the robotic device 104 may be instructed or otherwise stimulated to perform a remedial action to enable the object 202 to be returned to the expected path. For example, the robotic device 104 may be stimulated to increase or decrease speed, raise or lower the elevation of the object 202, or the like. In at least one example, detection that the object is deviating from the expected path may cause the robotic device 104 to perform actions to stabilize the object 202. After deviation of the item from the expected path, it is contemplated that a new expected path may be determined for the object 202 that accounts for the deviation.

In another non-limiting example, the light information 206 and the light information 208 may be utilized by the respective robotic devices of FIG. 2 to coordinate movement and/or speed with one another. In some examples, a "leader" device may be designated (e.g., by the management module via a set of instructions related to task execution). The "leader" device (e.g., the robotic device 102 may perform task execution irrespective of the actions of the "follower" device (e.g., the robotic device 104), while the "follower" device may utilize the light information 206 to synchronize the execution of its actions to those of the "leader" device. As a non-limiting example, the "follower" may match the "leaders" speed with respect to vertical and/or horizontal motion.

Figure 3:
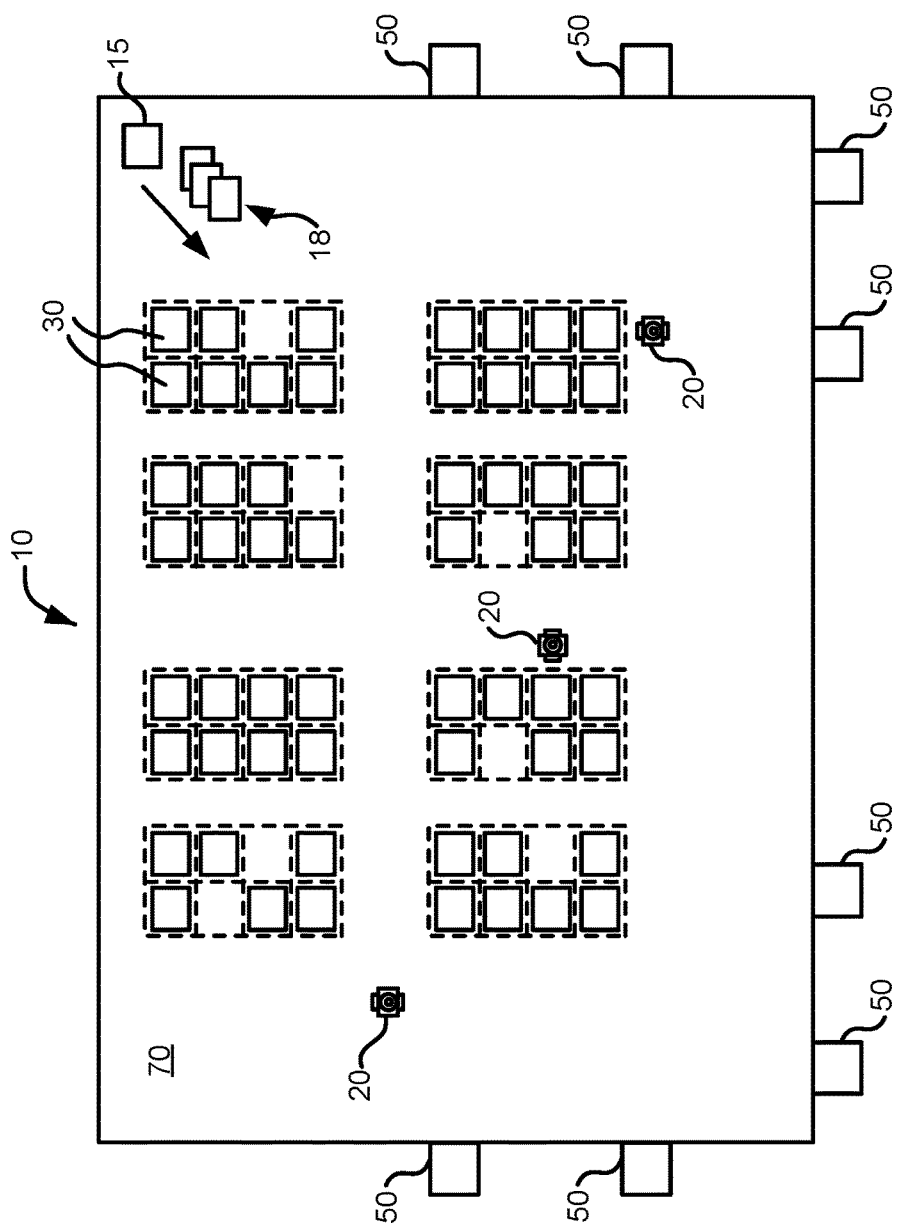
FIG. 3 illustrates components of an inventory system according to a particular embodiment.

FIG. 3 illustrates components of an inventory system according to a particular embodiment. As a non-limiting example, the inventory system 10 may include a management module 15, one or more mobile drive units 20, one or more inventory holders 30, and one or more inventory stations 50. Individual inventory stations may include one or more robotic devices (e.g., robotic arms). The mobile drive units 20 may transport inventory holders 30 between points within a workspace 70 (e.g., a warehouse, a storage facility, or the like) in response to commands communicated by management module 15. Within the inventory system 10, each inventory holder 30 may store one or more types of inventory items. As a non-limiting example, the robotic devices of the inventory stations (not depicted) may transport items from, for example, the inventory holders 30 to a packaging area. The robotic devices are discussed further with respect to FIGS. 4-6. As a result, inventory system 10 may be capable of moving inventory items between locations within the workspace 70 to facilitate the entry, processing, and/or removal of inventory items from inventory system 10 and the completion of other tasks involving inventory items.

In at least one embodiment, the management module 15 may assign tasks to appropriate components of inventory system 10 and coordinates operation of the various components in completing the tasks. These tasks may relate not only to the movement and processing of inventory items, but also to the management and maintenance of the components of the inventory system 10. For example, the management module 15 may assign portions of the workspace 70 as parking spaces for the mobile drive units 20, the scheduled recharge or replacement of mobile drive unit batteries, the storage of empty inventory holders 30, or any other operations associated with the functionality supported by inventory system 10 and its various components. The management module 15 may select components of inventory system 10 to perform these tasks and communicate appropriate commands and/or data to the selected components to facilitate completion of these operations. Although shown in FIG. 1 as a single, discrete component, the management module 15 may represent multiple components and may represent or include portions of the mobile drive units 20 or other elements of the inventory system 10. As a result, any or all of the interactions between a robotic device (e.g., the mobile drive units 20, one or more robotic arms, etc.) and the management module 15 that are described below may, in particular embodiments, may represent peer-to-peer communication between robotic devices (e.g., any suitable combination of the mobile drive units 20 and/or one or more robotic arms). The components and operation of an example embodiment of management module 15 are discussed further below with respect to FIG. 5.

The mobile drive units 20 may move inventory holders 30 between locations within the workspace 70. The mobile drive units 20 may represent any devices or components appropriate for use in the inventory system 10 based on the characteristics and configuration of the inventory holders 30 and/or other elements of inventory system 10. In a particular embodiment of inventory system 10, the mobile drive units 20 represent independent, self-powered devices configured to freely move about the workspace 70. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, the mobile drive units 20 represent elements of a tracked inventory system configured to move the inventory holder 30 along tracks, rails, cables, crane system, or other guidance or support elements traversing the workspace 70. In such an embodiment, the mobile drive units 20 may receive power and/or support through a connection to the guidance elements, such as a powered rail. Additionally, in particular embodiments of the inventory system 10 the mobile drive units 20 may be configured to utilize alternative conveyance equipment to move within the workspace 70 and/or between separate portions of the workspace 70. The components and operation of an example embodiment of a mobile drive unit are discussed further below with respect to FIGS. 2 and 3.

Additionally, the mobile drive units 20 may be capable of communicating with the management module 15 to receive information identifying selection of the inventory holders 30, transmit the locations of the mobile drive units 20, or exchange any other suitable information to be used by the management module 15 or the mobile drive units 20 during operation. The mobile drive units 20 may communicate with the management module 15 wirelessly, using wired connections between the mobile drive units 20 and the management module 15, and/or in any other appropriate manner. As one example, particular embodiments of the mobile drive units 20 may communicate with the management module 15 and/or with one another using 802.11, Bluetooth, or Infrared Data Association (IrDA) standards, or any other appropriate wireless communication protocol. As another example, in a tracked inventory system 10, tracks or other guidance elements upon which the mobile drive units 20 move may be wired to facilitate communication between the mobile drive units 20 and other components of the inventory system 10. Furthermore, as noted above, the management module 15 may include components of individual mobile drive units 20. Thus, for the purposes of this description and the claims that follow, communication between the management module 15 and a particular mobile drive unit 20 may represent communication between components of a particular mobile drive unit 20. In general, the mobile drive units 20 may be powered, propelled, and controlled in any manner appropriate based on the configuration and characteristics of the inventory system 10.

In at least one embodiment, the inventory holders 30 store inventory items. In a particular embodiment, the inventory holders 30 may include multiple storage bins with each storage bin capable of holding one or more types of inventory items. The inventory holders 30 are capable of being carried, rolled, and/or otherwise moved by the mobile drive units 20. In particular embodiments, the inventory holder 30 may provide additional propulsion to supplement that provided by the mobile drive unit 20 when moving inventory holder 30.

Additionally, in particular embodiments, the inventory items may also hang from hooks or bars (not shown) within or on the inventory holder 30. In general, the inventory holder 30 may store inventory items in any appropriate manner within the inventory holder 30 and/or on the external surface of the inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. The mobile drive unit 20 may be configured to rotate the inventory holder 30 at appropriate times to present a particular face and the bins associated with that face to an operator or other components of the inventory system 10.

In at least one embodiment, the inventory items represent any objects suitable for storage, retrieval, and/or processing in an automated inventory system 10. For the purposes of this description, "inventory items" may represent any one or more objects of a particular type that are stored in the inventory system 10. Thus, a particular inventory holder 30 is currently "storing" a particular inventory item if the inventory holder 30 currently holds one or more units of that type. As one example, the inventory system 10 may represent a mail order warehouse facility (e.g., operated by an electronic marketplace provider), and inventory items may represent merchandise stored in the warehouse facility. During operation, the mobile drive units 20 may retrieve the inventory holders 30 containing one or more inventory items requested in an order to be packed for delivery to a customer or the inventory holders 30 carrying pallets containing aggregated collections of inventory items for shipment. Moreover, in particular embodiments of the inventory system 10, boxes containing completed orders may themselves represent inventory items.

In particular embodiments, the inventory system 10 may also include one or more inventory stations 50 which will be further discussed in connection with FIG. 4. Generally, the inventory stations 50 represent locations designated for the completion of particular tasks involving inventory items. Such tasks may include the removal of inventory items from the inventory holders 30 (e.g., by one or more robotic devices such as a robotic arm), the introduction of inventory items into the inventory holders 30, the counting of inventory items in the inventory holders 30, the decomposition of inventory items (e.g. from pallet- or case-sized groups to individual inventory items), the consolidation of inventory items between the inventory holders 30, and/or the processing or handling of inventory items in any other suitable manner. In particular embodiments, the inventory stations 50 may represent the physical locations where a particular task involving inventory items can be completed within the workspace 70. In alternative embodiments, the inventory stations 50 may represent both the physical location and also any appropriate equipment (e.g., one or more robotic arms or other suitable robotic devices) for processing or handling inventory items, such as scanners for monitoring the flow of inventory items in and out of the inventory system 10, communication interfaces for communicating with the management module 15, and/or any other suitable components. The inventory stations 50 may be controlled, entirely or in part, by human operators. Moreover, the human of the inventory stations 50 may be capable of performing certain tasks involving inventory items, such as packing, counting, or transferring inventory items, as part of the operation of the inventory system 10.

In at least one embodiment, the workspace 70 represents an area associated with the inventory system 10 in which the mobile drive units 20 can move and/or the inventory holders 30 can be stored. For example, the workspace 70 may represent all or part of the floor of a mail-order warehouse in which the inventory system 10 operates. Although FIG. 1 shows, for the purposes of illustration, an embodiment of the inventory system 10 in which the workspace 70 includes a fixed, predetermined, and finite physical space, particular embodiments of the inventory system 10 may include the mobile drive units 20 and the inventory holders 30 that are configured to operate within the workspace 70 that is of variable dimensions and/or an arbitrary geometry. While FIG. 1 illustrates a particular embodiment of the inventory system 10 in which the workspace 70 is entirely enclosed in a building, alternative embodiments may utilize the workspace 70 in which some or all of the workspace 70 is located outdoors, within a vehicle (such as a cargo ship), or otherwise unconstrained by any fixed structure.

In operation, the management module 15 may select appropriate components to complete particular tasks and may transmit task assignments 18 to the selected components to trigger completion of the relevant tasks. Each of the task assignments 18 defines one or more tasks to be completed by a particular component. These tasks may relate to the retrieval, storage, replenishment, and counting of inventory items and/or the management of the mobile drive units 20, the inventory holders 30, the inventory stations 50 and other components of the inventory system 10 (e.g., other robotic devices such as robotic arms of the inventory stations 50). Depending on the component and the task to be completed, a particular task assignment 18 may identify locations, components, and/or actions/commands associated with the corresponding task and/or any other appropriate information to be used by the relevant component in completing the assigned task.

In particular embodiments, the management module 15 may generate task assignments 18 based, in part, on inventory requests that the management module 15 receives from other components of the inventory system 10 and/or from external components in communication with the management module 15. These inventory requests identify particular operations to be completed involving inventory items stored or to be stored within the inventory system 10 and may represent communication of any suitable form. For example, in particular embodiments, an inventory request may represent a shipping order specifying particular inventory items that have been purchased by a customer and that are to be retrieved from the inventory system 10 for shipment to the customer. The management module 15 may also generate the task assignments 18 independently of such inventory requests, as part of the overall management and maintenance of the inventory system 10. For example, the management module 15 may generate the task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of the inventory system 10. After generating one or more of the task assignments 18, the management module 15 may transmit the generated task assignments 18 to appropriate components for completion of the corresponding task. The relevant components may then execute their assigned tasks.

With respect to the mobile drive units 20 specifically, the management module 15 may, in particular embodiments, communicate task assignments 18 to selected mobile drive units 20, robotic arms (e.g., the robotic device 102 and/or the robotic device 104), or any suitable robotic devices of the inventory system 10. The management module 15 may select one or more particular robotic devices to assign the relevant task based on the location or state of the selected robotic device(s), an indication that the selected robotic device has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, an item to be retrieved from a storage location, packaging instructions for the item to be performed by one or more robotic devices, a storage location where the mobile drive unit 20 should park until receiving another task, or a location associated with any other task appropriate based on the configuration, characteristics, and/or state of inventory system 10, as a whole, or individual components of the inventory system 10. For example, in particular embodiments, such decisions may be based on the popularity of particular inventory items, the staffing of a particular inventory station 50, the tasks currently assigned to a particular mobile drive unit 20, the tasks currently assigned to the robotic devices (e.g., robotic arms of the inventory stations 50), and/or any other appropriate considerations.

As part of completing respective tasks the mobile drive units 20 may dock with and transport the inventory holders 30 within the workspace 70. The mobile drive units 20 may dock with the inventory holders 30 by connecting to, lifting, and/or otherwise interacting with the inventory holders 30 in any other suitable manner so that, when docked, the mobile drive units 20 are coupled to and/or support the inventory holders 30 and can move the inventory holders 30 within the workspace 70. The mobile drive unit 20 and inventory holder 30 may be configured to dock in any manner suitable to allow the mobile drive unit 20 to move the inventory holder 30 within workspace 70. Additionally, as noted below, in particular embodiments, the mobile drive units 20 represent all or portions of the inventory holders 30. In such embodiments, the mobile drive units 20 may not dock with the inventory holders 30 before transporting the inventory holders 30 and/or the mobile drive units 20 may each remain continually docked with a particular inventory holder 30.

While the appropriate components of inventory system 10 complete assigned tasks, the management module 15 may interact with the relevant components to ensure the efficient use of space, equipment, manpower, and other resources available to inventory system 10. As one specific example of such interaction, management module 15 is responsible, in particular embodiments, for planning the paths the mobile drive units 20 take when moving within the workspace 70 and for allocating use of a particular portion of the workspace 70 to a particular mobile drive unit 20 for purposes of completing an assigned task. In such embodiments, the mobile drive units 20 may, in response to being assigned a task, request a path to a particular destination associated with the task. Moreover, while the description below focuses on one or more embodiments in which the mobile drive unit 20 receives paths from a centralized management module, the mobile drive unit 20 may, in alternative embodiments, generate its own paths.

Components of the inventory system 10 may provide information to the management module 15 regarding their current state, other components of the inventory system 10 with which they are interacting, and/or other conditions relevant to the operation of the inventory system 10. This may allow the management module 15 to utilize feedback from the relevant components to update algorithm parameters, adjust policies, or otherwise modify its decision-making to respond to changes in operating conditions or the occurrence of particular events.

In addition, while the management module 15 may be configured to manage various aspects of the operation of the components of the inventory system 10, in particular embodiments, the components themselves may also be responsible for decision-making relating to certain aspects of their operation, thereby reducing the processing load on the management module 15.

Thus, based on its knowledge of the location, current state, and/or other characteristics of the various components of the inventory system 10 and an awareness of all the tasks currently being completed, the management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of the inventory system 10 may be able to support a number of techniques for efficiently executing various aspects of the operation of the inventory system 10. As a result, particular embodiments of the management module 15 may, by implementing one or more management techniques described below, enhance the efficiency of the inventory system 10 and/or provide other operational benefits. Many possible scenarios may be possible, a few of which will be discussed further below with respect to FIGS. 4-8.

Figure 4:
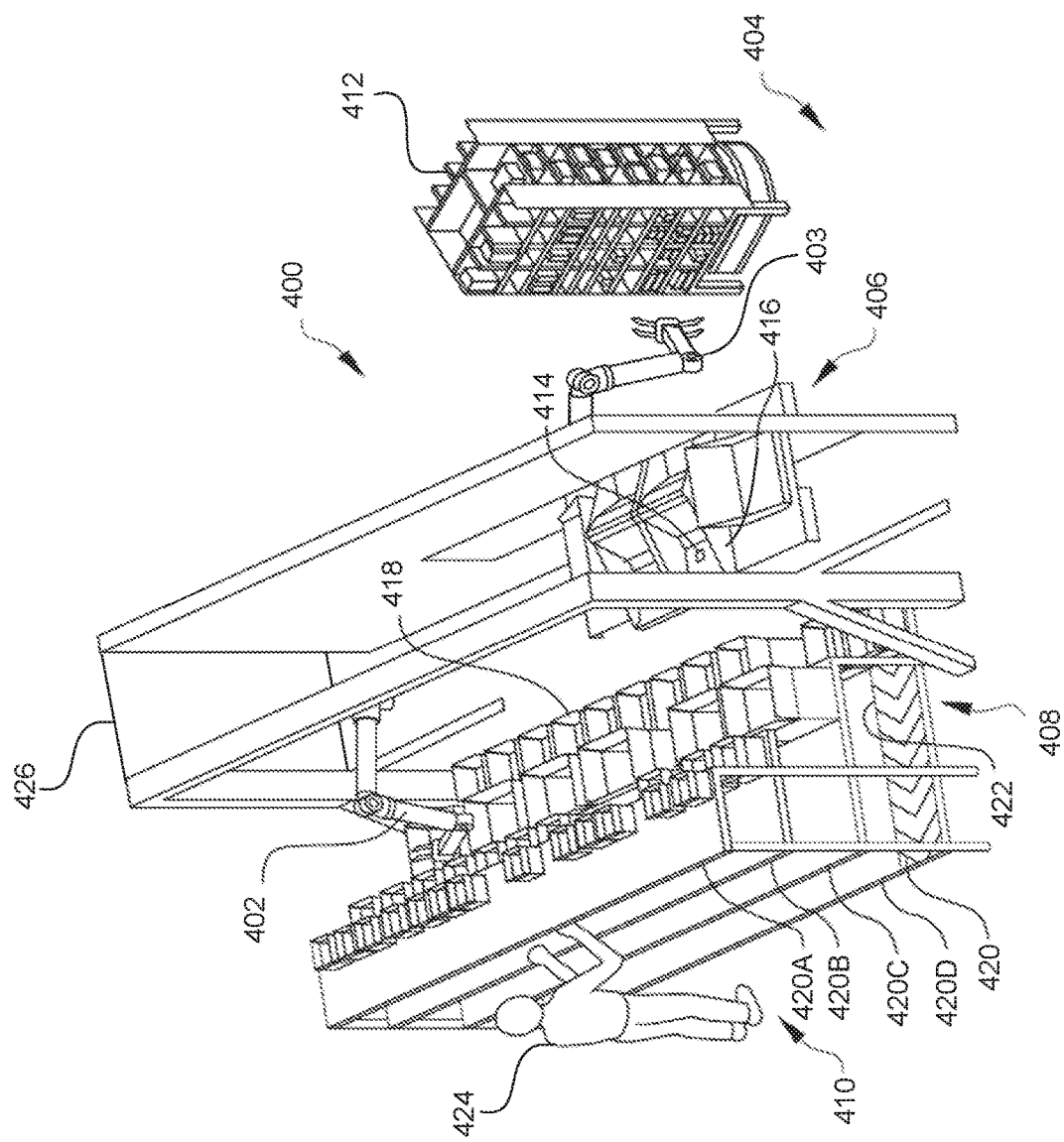
FIG. 4 illustrates an example of a station utilizing a robotic arm for handling of inventory items according to particular embodiments.

FIG. 4 illustrates an example of a station having a robotic arm 402 and a robotic arm 403. The station 400 can represent a station 50 described elsewhere herein. The station 400 can include a picking area 404, a grasping area 406, a release area 408, and a packing area 410. A mobile drive unit (e.g., the mobile drive unit 20 described elsewhere herein) can bring an inventory holder 412 (e.g., inventory holder 30 described elsewhere herein), to the picking area 404. The robotic arm 403 in the picking area 404 can remove an inventory item 414 from the inventory holder 412 and transfer the inventory item 414 to the grasping area 406 (e.g., to a tray 416). The tray 416 may be one of a plurality of trays in the grasping area 406. In some embodiments, the plurality of trays 416 are moveable so as to bring empty trays into position to be filled by the robotic arm 403 and trays bearing items into a position to be accessed by the robotic arm 402. Multiple and/or movable trays may allow the robotic arm 402 and the robotic arm 403 to work at different rates and may reduce wait times in a workflow at the station 400. Multiple trays may also facilitate simultaneous, independent operation of the robotic arm 402 and the robotic arm 403.

As a non-limiting example, the robotic arm 402 may receive a set of instructions to move an inventory item 414 from the grasping area 406 and into the release area 408, e.g., into a box 418 positioned on a shelf 420A-D of a stadium shelving unit 420. The shelves 420A-D of the stadium shelving unit 420 may be different widths, which may permit the robotic arm 402 to access a variety of boxes from above in a manner that also permits the boxes to be accessed along a common vertical face in the packing area 410. Conveyance mechanisms 422 may be provided on any of the shelves 420A-D of the stadium shelving unit 420 to move filled boxes from the release area 408 to the packing area 410, e.g., to within reach of a worker 424 in the packing area 410 for subsequent operations such as packing a box 418 with completed orders for shipping. Although a single conveyance mechanism 422 is depicted in FIG. 4 so as to avoid confusion in the drawing, any number of conveyance mechanisms 422 of any type (e.g., conveyor, pusher, puller) on any shelf 420A-D may be provided to move boxes 418 to the packing area 410. Furthermore, although a stadium shelving unit 420 is depicted in FIG. 4, any other form of transfer mechanism may be utilized to transfer a box or other receptacle with an item received from a robotic arm from a release area 408 to a packing area 410. As illustrative examples, the stadium shelving unit 420 may be augmented or replaced by a conveyor system (e.g., for moving empty and/or loaded boxes relative to the robotic arm 402) or a set of inventory holders movable by mobile drive units. Transfer mechanisms between the release area 408 and the packing area 410 may provide a degree of separation between human operators and the robotic arm 402 and the robotic arm 403, for example, to facilitate compliance with safety measures.

In some embodiments, the station 400 may include a projection area 426 (e.g., the projection area 112 of FIG. 1 and/or the projection area 204 of FIG. 2. In at least one example, the projection area 426 is provided as depicted in FIG. 4 or on a wall, a ceiling, a floor, or any suitable location that provides the robotic arm 402 and the robotic arm 403 direct visual input. In at least one embodiment, the robotic arm 402 and the robotic arm 403 may intermittently or consistently be unable to obtain direct visual input of each other.

As a non-limiting example, the robotic arm 402 and/or the robotic arm 403 may provide light information utilizing projection area 426. In accordance with at least one embodiment, the projection area 426 comprises any suitable material (e.g., concrete, wood, cement, projection screen, fabric, or the like configured to provide display of light information. In at least some examples, the light information by the projecting device may be utilized by the projecting device to determine a particular distance between the projection area 426 and the projecting device. The distance calculation may be utilized in later computations in order to ascertain depth (e.g., a distance measurement value corresponding to a distance between the projecting device and the projection area 426. As a non-limiting example, the robotic arm 402 may project light onto the projection area 426. The robotic arm 402 (or a component of the robotic arm 402) may determine a size associated with particular light points of the projection area 426. The size of the projected light points may be compared to a specification that indicates a particular size of the light point, given a particular distance from the projection area 426. A component of the robotic arm 402 may compute a distance measurement between the robotic arm 402 and the projection area 426 utilizing the expected light point size and the actual light point size. Accordingly, the computed distance measurement may be utilized in order to determine the distance from the robotic arm 403 to the projection area 426.

Figure 5:
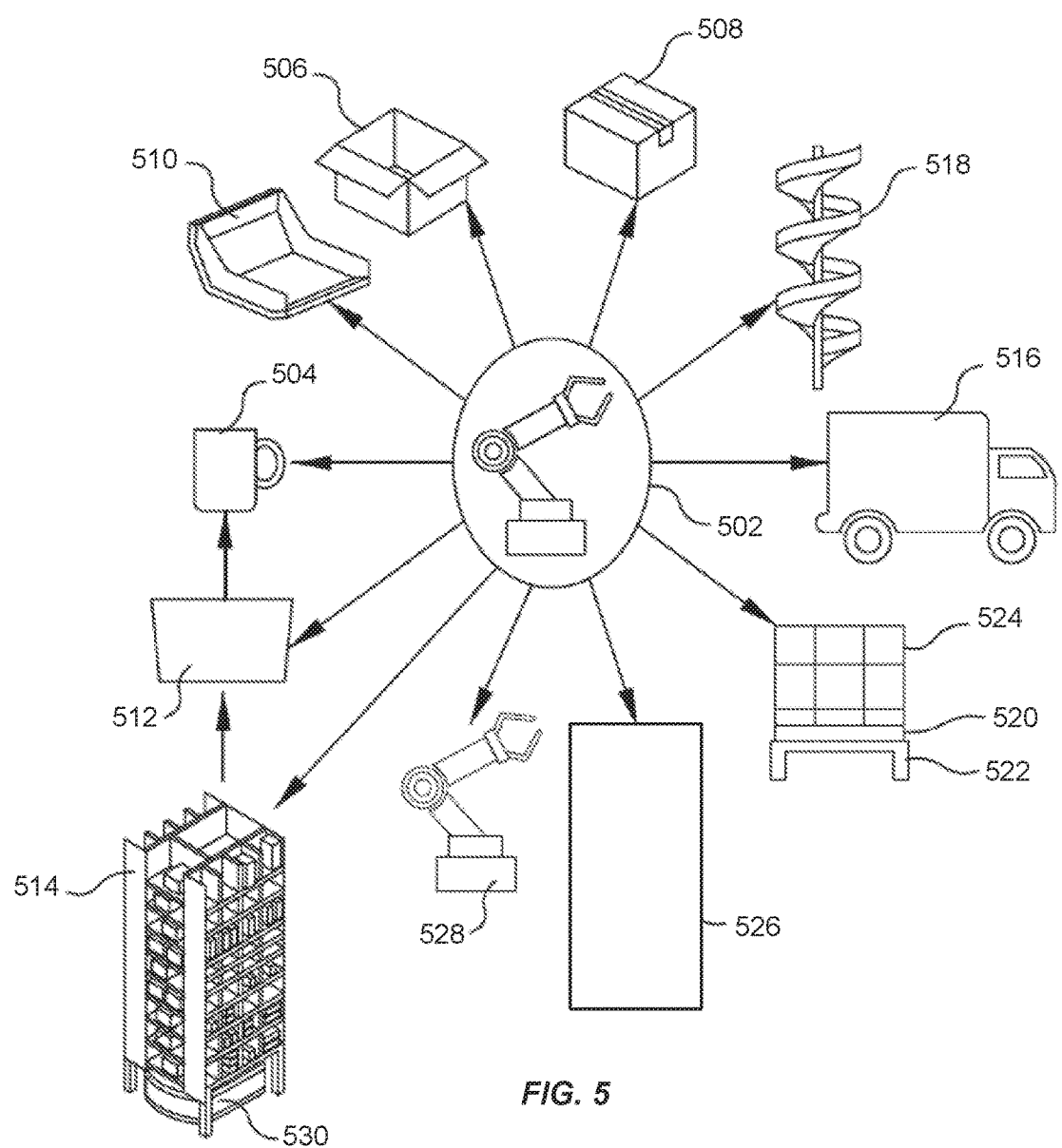
FIG. 5 illustrates examples of inventory system components with which a robotic arm may interact according to particular embodiments.

FIG. 5 illustrates several components of an inventory system with which a robotic arm 502 (e.g., the robotic arm 402, the robotic arm 403 of FIG. 4) can interact. The robotic arm 502 can move inventory items 504 to or from open boxes 506, completed boxes 508, trays 510, drawers 512, inventory holders 514 (such as may store inventory items accessible for fulfilling orders and/or store inventory items sorted into compiled orders) or associated components of inventory holders 514 (such as bins, totes, slots, or compartments), delivery or other transport vehicles 516, conveyance mechanisms 518 (such as spirals or other conveyors, chutes, or ramps), pallets 520 (and/or any structure 522 supporting the pallet 520 or receptacles 524 stacked on the pallet), and/or any other any other elements of an inventory system. The robotic arm 502 may interact with human operators 526 and/or other robotic arms 528 to accomplish such movements of inventory items 504 and/or to facilitate other functions involving the human operators 526 or other robotic arms 528. Furthermore, in addition to (or as alternatives to) grasping or otherwise facilitating movement of individual inventory items 504, the robotic arm 502 may also grasp or otherwise facilitate movement of other components of the inventory system, including, but not limited to the trays 510, open boxes 506, closed boxes 508, drawers 512, bins, totes, pallets 520, structures 522, or receptacles 524 shown in FIG. 5.

As one of many illustrative examples, the robotic arm 502 can interact with a tray 510, such as moving an inventory item 504 to or from the tray 510, e.g., to an open box 506 or from a human operator 526 or the other robotic arm 528. In some aspects, a robotic arm 502 may remove or replace a drawer 512 or other bin, tote, or receptacle with respect to an inventory holder 514 (such as may be moved by mobile drive unit 530). The robotic arm 502 may move the drawer 512 to or from an ergonomically appropriate position at which a human operator 526 (or other robotic arm 528) may perform prior or subsequent actions with the inventory item 504. In some aspects, the robotic arm 502 may directly move inventory item 504 to or from storage locations within the inventory holder 514. The robotic arm 502 may grasp and move open boxes 506 (such as empty or partially-filled boxes) or closed and sealed boxes 508 to or from pallets 520, inventory holders 514, conveyance mechanisms 518, and/or delivery vehicles 516. In at least one embodiment, the robotic arm 502 may interact with the other robotic arm 528 to perform coordinated task execution such as the coordinated tasks discussed above with respect to FIG. 2.

Figure 6:
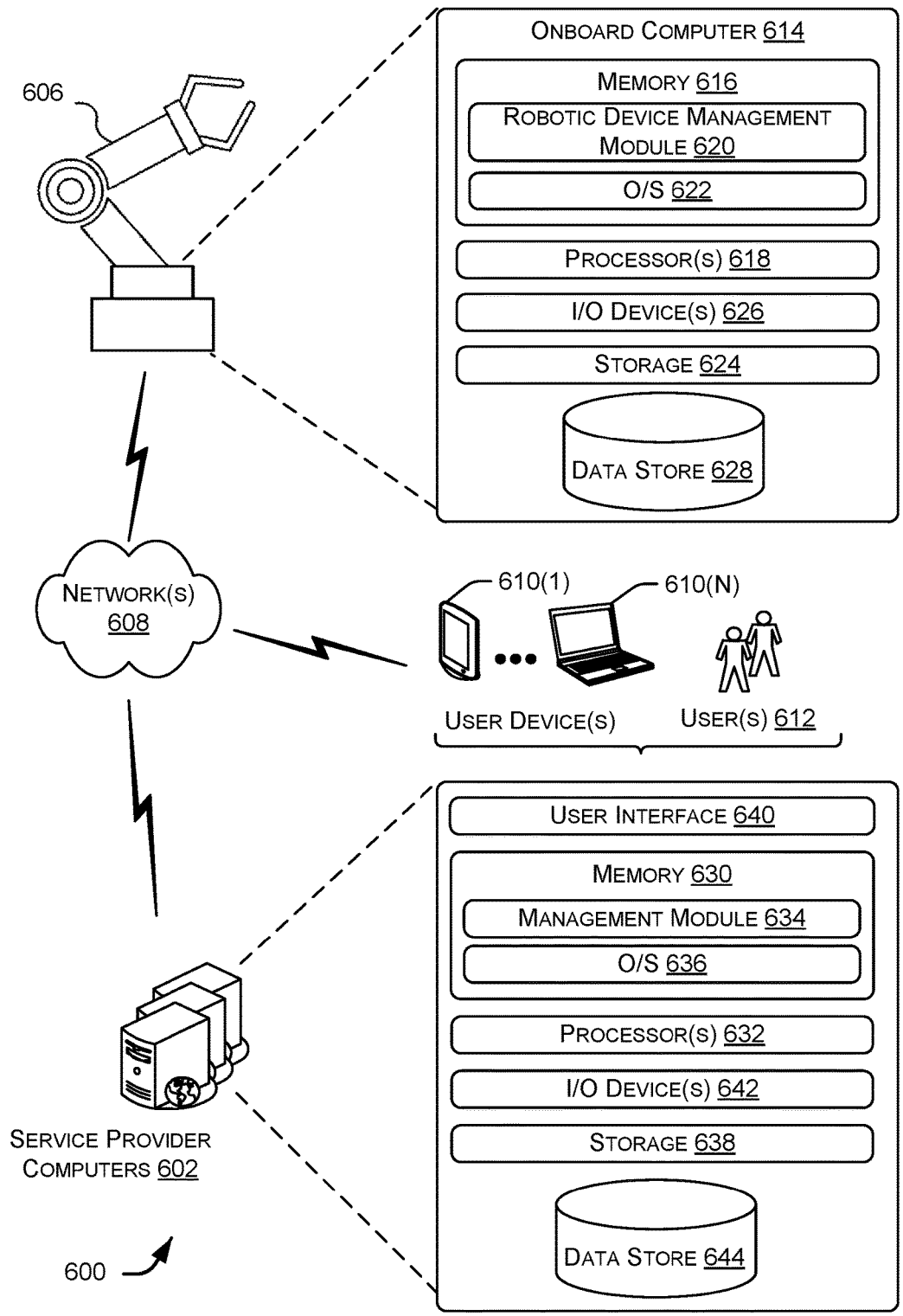
FIG. 6 is an example system architecture for implementing aspect of the inventory system, in accordance with at least one embodiment.

FIG. 6 is an example system architecture 600 for implementing aspect of the inventory system 10 of FIG. 3, in accordance with at least one embodiment. The system architecture 600 may include a service provider computers 602. The service provider computers 602 may support an electronic marketplace (not shown) and interface with purchase and delivery services of the electronic marketplace. In this manner, the service provider computers 602 may coordinate receiving, storing, packaging, and shipping of items in a warehouse operated by, or on behalf of, the electronic marketplace provider. In some examples, the service provider computers may be a stand-alone service operated on its own or in connection with an electronic marketplace. In either example, the service provider computers 602 may be in communication with the mobile drive units 20 of FIG. 3 and robotic arm(s) 606 (e.g., the robotic arm 402 and/or the robotic arm 403) via one or more network(s) 608 (hereinafter, "the network 608"). The network 608 may include any one or a combination of many different types of networks, such as cable networks, the Internet, wireless networks, cellular networks, radio networks, and other private and/or public networks.

User devices 610(1)-610(N) (hereinafter, "the user device 610") may also be in communication with the service provider computers 602 via the network 608. The user device 610 may be operable by one or more users 612 (hereinafter, "the users 612") to access the service provider computers 602 (or an electronic marketplace) via the network 608. The user device 610 may be any suitable device capable of communicating with the network 608. For example, the user device 610 may be any suitable computing device such as, but not limited to, a mobile phone, a smart phone, a personal digital assistant (PDA), a laptop computer, a thin-client device, a tablet PC, a desktop computer, a set-top box, or other computing device. In some examples, the user device 610 may be in communication with the service provider computers 602 via one or more web servers constituting an electronic marketplace (not shown) connected to the network 608 and associated with the service provider computers 602. The user device 610 may be utilized to stimulate an item request (e.g., by accessing a network page of the electronic marketplace to purchase an item). The item request may stimulate the service provider computers 602 to perform various inventory management/contention resolution functions described above.

Turning now to the details of the robotic arm(s) 606, the robotic arm(s) 606 may include an onboard computer 614 (or may be communicatively coupled to a computer including the components of depicted in the onboard computer 614) including at least one memory 616 and one or more processing units (or processor(s)) 618. The processor(s) 618 may be implemented as appropriate in hardware, computer-executable instructions, software, firmware, or combinations thereof. Computer-executable instruction, software or firmware implementations of the processor(s) 618 may include computer-executable or machine-executable instructions written in any suitable programming language to perform the various functions described. The memory 616 may include more than one memory and may be distributed throughout the onboard computer 614. The memory 616 may store program instructions (e.g. the robotic device management module 620, and example of the robotic device management module of FIG. 8) that are loadable and executable on the processor(s) 618, as well as data generated during the execution of these programs. Depending on the configuration and type of memory including the robotic device management module 620, the memory 616 may be volatile (such as random access memory (RAM)) and/or non-volatile (such as read-only memory (ROM), flash memory, or other memory). The memory 616 may also include additional removable storage and/or non-removable storage including, but not limited to, magnetic storage, optical discs, and/or tape storage. The disk drives and their associated computer-readable media may provide non-volatile storage of computer-readable instructions, data structures, program modules, and other data for the computing devices. In some implementations, the memory 616 may include multiple different types of memory, such as static random access memory (SRAM), dynamic random access memory (DRAM), or ROM. Turning to the contents of the memory 616 in more detail, the memory 616 may include an operating system 622 and one or more application programs, modules or services for implementing the features disclosed herein including at least the robotic device management module 620.

In some examples, the onboard computer 614 may also include additional storage 624, which may include removable storage and/or non-removable storage. The additional storage 624 may include, but is not limited to, magnetic storage, optical disks, and/or tape storage. The disk drives and their associated computer-readable media may provide non-volatile storage of computer-readable instructions, data structures, program modules, and other data for the computing devices.

The memory 616 and the additional storage 624, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the onboard computer 614. The modules of the onboard computer 614 may include one or more components. The onboard computer 614 may also include input/output (I/O) device(s) 626 and/or ports, such as for enabling connection with a keyboard, a mouse, a pen, a voice input device, a touch input device, a display, speakers, a printer, or other I/O device. The I/O device(s) 626 may enable communication with the other systems of the robotic arm(s) 606.

The onboard computer 614 may also include data store 628. The data store 628 may include one or more databases, data structures, or the like for storing and/or retaining information associated with the robotic arm(s) 606.

Turning now to the details of the user device 610. The user device 610 may be used by the user(s) 612 for interacting with the service provider computers 602. The user device 610 may therefore include a memory, a processor, a user-interface, a web-service application, and any other suitable feature to enable communication with the features of the system architecture 600. The web service application may be in the form of a web browser, an application programming interface (API), virtual computing instance, or other suitable application. In some examples, when the service provider computers 602 are part of, or share an association with, an electronic marketplace, the user device 610 may be used by the user(s) 612 for procuring one or more items from the electronic marketplace.

The service provider computers 602, perhaps arranged in a cluster of servers or as a server farm, may host web service applications. These servers may be configured to host a website (or combination of websites) viewable via the user device 610. In at least one example, the service provider computers 602 may be configured to manage the mobile drive units 20 and/or the robotic arm(s) 606 as part of an inventory system (e.g., the inventory system 10 of FIG. 3). The service provider computers 602 may include at least one memory 630 and one or more processing units (or processor(s)) 632. The processor(s) 632 may be implemented as appropriate in hardware, computer-executable instructions, software, firmware, or combinations thereof. Computer-executable instruction, software or firmware implementations of the processor(s) 632 may include computer-executable or machine-executable instructions written in any suitable programming language to perform the various functions described.

The memory 630 may include more than one memory and may be distributed throughout the service provider computers 602. The memory 630 may store program instructions (e.g., management module 634) that are loadable and executable on the processor(s) 632, as well as data generated during the execution of these programs. Depending on the configuration and type of memory including the management module 634, the memory 630 may be volatile (such as random access memory (RAM)) and/or non-volatile (such as read-only memory (ROM), flash memory, or other memory). The service provider computers 602 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 630 may include multiple different types of memory, such as static random access memory (SRAM), dynamic random access memory (DRAM), or ROM.

Turning to the contents of the memory 630 in more detail, the memory 630 may include an operating system 636 and one or more application programs, modules or services for implementing the features disclosed herein including at least the management module 634. The management module 634, in some examples, may determine tasks for the mobile drive units 20 and/or the robotic arm(s) 606, determine a set of actions to perform to execute the task, determine a best course of action when the mobile drive units 20 and/or the robotic arm(s) 606 encounter conflict. For example, when the mobile drive units 20 are in network communication with the service provider computers 602, the mobile drive units 20 may receive at least some instructions from the service provider computers 602 as the management module 634 is executed by the processors 632. In some examples, the mobile drive unit 20 executes the management module 634 to operate independent of the service provider computers 602. Similarly, the robotic arm(s) may be in network communication with the service provider computers 602. The robotic arm(s) 606 may receive at least some instructions from the service provider computers 602 as the management module 634 is executed by the processors 632. In some examples, the robotic arm(s) may operate independent of the service provider computers 602.

In some examples, the service provider computers 602 may also include additional storage 638, which may include removable storage and/or non-removable storage. The additional storage 638 may include, but is not limited to, magnetic storage, optical disks, and/or tape storage. The disk drives and their associated computer-readable media may provide non-volatile storage of computer-readable instructions, data structures, program modules, and other data for the computing devices.

The memory 630 and the additional storage 638, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the service provider computers 602. The modules of the service provider computers 602 may include one or more components. The service provider computers 602 may also include input/output (I/O) device(s) 642 and/or ports, such as for enabling connection with a keyboard, a mouse, a pen, a voice input device, a touch input device, a display, speakers, a printer, or other I/O device.

In some examples, the service provider computers 602 may include a user interface 640. The user interface 640 may be utilized by an operator, or other authorized user to access portions of the service provider computers 602. In some examples, the user interface 640 may include a graphical user interface, web-based applications, programmatic interfaces such as application programming interfaces (APIs), or other user interface configurations. The service provider computers 602 may also include data store 644. The data store 644 may include one or more databases, data structures, or the like for storing and/or retaining information associated with the service provider computers 602. In some examples, the service provider computers 602 may store a larger amount of information in the data store 644 than the onboard computer 614 is capable of storing in the data store 628. Thus, in some examples, at least a portion of the information from the databases in the data store 644 is copied to the databases of the data store 628, e.g., periodically, occasionally, in connection with an event, or otherwise. In this manner, the data store 628 may have up-to-date information, without having to maintain the databases.

In at least one embodiment, the management module 634 may provide the functionality of the management module 15 of FIG. 3 from a mobile drive unit centric, robotic arm centric, or server centric viewpoint. That is, the management module 634 may additionally, or alternatively, be configured to operate on one or more robotic arms (e.g., the robotic arms 606) and/or one or more mobile drive units (e.g., the mobile drive units 20).

Figure 7:
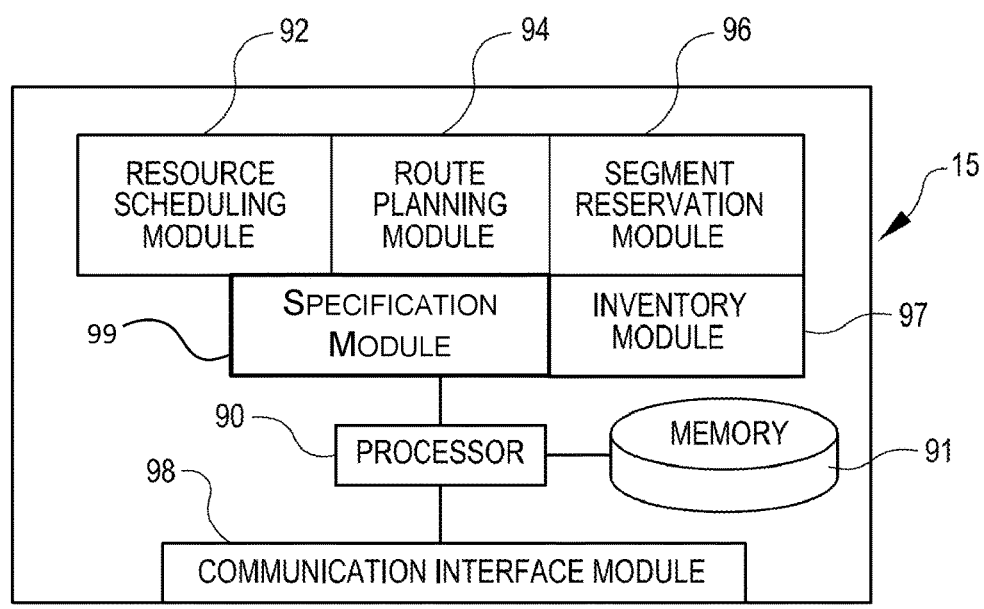
FIG. 7 illustrates in greater detail the components of an example management module that may be utilized in particular embodiments of the inventory system shown in FIG. 3.

FIG. 7 illustrates in greater detail the components of a particular embodiment of a management module (e.g., the management module 15 of FIG. 1). As shown, the example embodiment includes a resource scheduling module 92, a route planning module 94, a segment reservation module 96, an inventory module 97, a communication interface module 98, and a specification module 99. As discussed above, the management module 15 may represent a single component, multiple components located at a central location within inventory system 10, or multiple components distributed throughout inventory system 10. For example, the management module 15 may represent components of one or more robotic devices (e.g., the mobile drive units 20, the robotic arm(s) 606 of FIG. 6) that are capable of communicating information between the robotic devices and coordinating movement of the robotic devices with the workspace 70 (and/or within the inventory stations 50). In general, the management module 15 may include any appropriate combination of hardware and/or software suitable to provide the described functionality.

In at least one embodiment, the resource scheduling module 92 may be configured to process received inventory requests and generate one or more assigned tasks to be completed by the components of the inventory system 10. The resource scheduling module 92 may also select one or more appropriate components for completing the assigned tasks and may communicate, via the communication interface module 98, the assigned tasks to the relevant components. In some examples, the resource scheduling module 92 may select the one or more appropriate components (e.g., the robotic arm 402 and the robotic arm 403 of FIG. 4) based on a location of the components and/or one or more tasks currently assigned to the components. Additionally, the resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station. Additionally, the resource scheduling module 92 may also be responsible for assigning tasks and/or updating previously-assigned tasks in response to contention resolution processing associated with one or more conflicts encountered by one or more robotic devices (e.g., the mobile drive units 20, the robotic arm(s) 606, etc.).

In at least one embodiment, the route planning module 94 may receive route requests from the mobile drive units 20. These route requests may identify one or more destinations associated with a task the requesting robotic device (e.g., mobile drive unit 20) is executing. In response to receiving a route request, the route planning module 94 may generate a path to one or more destinations identified in the route request. The route planning module 94 may implement any appropriate algorithms utilizing any appropriate parameters, factors, and/or considerations to determine the appropriate path. After generating an appropriate path, the route planning module 94 may transmit a route response identifying the generated path to the requesting robotic device using the communication interface module 98.

In at least one embodiment, the segment reservation module 96 may receive reservation requests from the mobile drive units 20 attempting to move along paths generated by the route planning module 94. These reservation requests may indicate a request for the use of a particular portion of the workspace 70 (referred to herein as a "segment") to allow the requesting mobile drive unit 20 to avoid collisions with other mobile drive units 20 while moving across the reserved segment. In response to received reservation requests, segment reservation module 96 may transmit a reservation response granting or denying the reservation request to the requesting mobile drive unit 20 using the communication interface module 98.

In at least one embodiment, the inventory module 97 may maintain information about the location and number of inventory items in the inventory system 10. Information can be maintained about the number of inventory items in a particular inventory holder 30, and the maintained information can include the location of those inventory items in the inventory holder 30. The inventory module 97 can also communicate with the mobile drive units 20, utilizing task assignments 18 of FIG. 3 to maintain, replenish or move inventory items within the inventory system 10. Similarly, the inventory module 97 can communicate with the robotic arm(s) 606 or any suitable robotic device, utilizing task assignments 18 of FIG. 3 to maintain, replenish or move inventory items within the inventory system 10.

In at least one embodiment, the communication interface module 98 may facilitate communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 20, a portion of the robotic arm(s) 606 or other components of inventory system 10. In such embodiments, communication interface module 810 may facilitate communication between management module 15 and other parts of the same system component.

In at least one embodiment, the specification module 99 may facilitate storage and management of specifications associated with one or more robotic devices of the inventory system 10. The specification module 99, in some cases, may be configured to receive/obtain specification information and may store such information within the memory 91 or any suitable storage location configured to store such information. The specification module 99 may be configured to receive specification requests (e.g., from a robotic device of the inventory system 10). The specification module 99 may further be configured to utilize data from the specification request to perform a search for specification corresponding to the request. As a non-limiting example, a specification request may be received that indicates the request pertains to a particular device and/or type of device, a location, or the like. If a particular device, or a type of device is indicated in the specification request, the specification module 99 may perform a search (e.g., of a data store that stores current specifications) for the specification corresponding to the specific device/type of device. The specification module 99 may be configured to provide the specification to one or more components of the system via the communication interface module 98. In at least one example, a location may be indicated in the specification request. If a location is provided, the specification module 99 may be configured to identify any suitable robotic device (or specific types of robotic devices) within a threshold distance of the location. In some examples, information related to the identified robotic devices (e.g., device identification, a type associated with the robotic device, etc.) may be utilized to identify one or more specifications. The identified specifications may be provided in a manner similar to that described above.

In general, the resource scheduling module 92, the route planning module 94, the segment reservation module 96, the inventory module 97, the communication interface module 98, and the specification module 99 may each represent any appropriate hardware and/or software suitable to provide the described functionality. In addition, as noted above, management module 15 may, in particular embodiments, represent multiple different discrete components and any or all of the resource scheduling module 92, the route planning module 94, the segment reservation module 96, the inventory module 97, and the communication interface module 98 may represent components physically separate from the remaining elements of management module 15. Moreover, any two or more of the resource scheduling module 92, the route planning module 94, the segment reservation module 96, the inventory module 97, and the communication interface module 98 may share common components.

Figure 8:
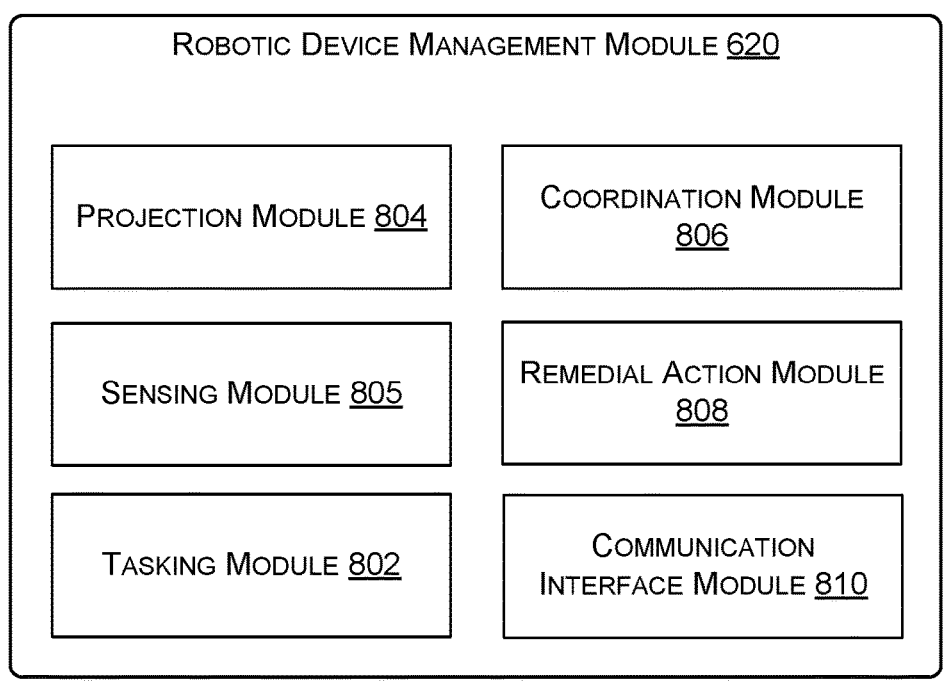
FIG. 8 illustrates in greater detail the components of a robotic device management module that may be utilized in particular embodiments of the inventory system shown in FIG. 3.

FIG. 8 illustrates in greater detail the components of a robotic device management module (e.g., the robotic device management module 620 of FIG. 6) that may be utilized in particular embodiments of the inventory system shown in FIG. 3. As shown, the example embodiment includes a tasking module 802, a projection module 804, a sensing module 805, a coordination module 806, a remedial action module 808, and a communication interface module 810. The robotic device management module 620 may represent a single component, multiple components located at a central location within inventory system 10, or multiple components distributed throughout inventory system 10. For example, robotic device management module 620 may represent components of one or more mobile drive units 20 and/or one or more robotic devices such as the robotic arms discussed herein, that are capable of communicating information between mobile drive units 20/robotic devices and coordinating the movement of the mobile drive units 20/robotic devices within the workspace 70. In general, the robotic device management module 620 may include any appropriate combination of hardware and/or software suitable to provide the described functionality.

In at least one embodiment, the tasking module 802 may be configured to receive a set of instructions (and/or task identification) from, for example, the management module 15 of FIG. 7. In at least one embodiment, the tasking module 802 may receive such instructions utilizing the communication interface module 810, a component of the robotic device management module 620, or another suitable component of the robotic device management module 620. In at least one embodiment, the tasking module 802 may store the set of instructions in onboard memory (e.g., in data store 628). In at least one embodiment, the tasking module 802 may be configured to modify the stored set of instructions according to output provided by the remedial action module 808, discussed below. In at least one embodiment, the tasking module 802 may be configured to communicate with the management module 15 (e.g., via one or more data networks) in order to request and/or receive additional and/or modified instructions (e.g., based at least in part on a remedial action determined by the remedial action module 808). Upon receipt of update instructions, or at another suitable time, the tasking module 802 may store the updated instructions as part of a process for managing the current set of instructions for a robotic device. In some examples, the tasking module 802 may manage sets of instructions corresponding to a group of robotic devices (e.g., a subset of the robotic devices of the inventory system 10, all of the robotic devices of the inventory system 10, etc.)

In at least one embodiment, the projection module 804 may be configured to receive and/or transmit light information. For example, the projection module 804 may receive at least a portion of the instructions received by the tasking module 802. The projection module 804 may be configured to identify a location or other suitable identifier for a particular projection area within a storage facility. For example, the projection module 804 may extract the location or other suitable identifier of the particular projection area from the instructions received by the tasking module 802. Alternatively, the projection module 804 may request (e.g., via the communication interface module 810) request the identification of the projection area to be used from, for example, the management module 15.

In at least one embodiment, the projection module 804 may be configured to identify a suitable projection area independent of communication and/or instructions from the management module 15. In one non-limiting example, the projection module 804 may be configured to interact and/or otherwise stimulate one or more sensors of a robotic devices (e.g., a camera, a global positioning system component, a coordinate positioning system component, etc.) to collect sensor data. In at least one example, the projection module 804 may be configured to determine a location of the robotic device based on the collected sensor data. Additionally, or alternatively, the projection module 804 may be configured to determine a location of the projection area in relation to the location of the robotic device. Accordingly, the projection module 804 may cause one or more sensors of the robotic device to focus in a particular direction/area of the storage facility with respect to the robotic device. In other words, if the robotic device is determined to be at location A, and the projection area is at location B, which is 10 feet directly to the North, then the projection module 804 may utilize such knowledge to instruct one or more sensors of the robotic device to focus sensing efforts in a direction/location corresponding to location B. In at least one embodiment, the projection module 804 is configured to analyze sensor data (e.g., images provided by the camera) to identify the projection area in physical space.

In at least one embodiment, the projection module 804 may be configured to determine an expected format of light information for a particular robotic device. For example, the projection module 804 may extract specification information (e.g., a specification identifier, a specification, etc.) from information received from the tasking module 802 or from the management module 15 (e.g., as part of a message containing the set of instructions, or as a separate message received from the management module 15). The projection module 804 may further be configured to utilize a specification identifier of the extracted information to perform a lookup (e.g., of a locally database of specifications) for a particular specification corresponding to the specification identifier. In other examples, the projection module 804 may be configured to request a particular specification corresponding to the specification identifier from a remote computing device (e.g., a centralized data store of specification information (e.g., one or more specifications individually associated with one or more robotic devices)).

In at least one example, the specification for a particular robotic device may be stored locally on the robotic device or in a centralized data store accessible by the robotic devices of the inventory system 10. Accordingly, in some embodiments, each robotic device may have local access to a specification that indicates format, attributes, and/or protocols for providing light information from the robotic device. As a non-limiting example, the specification may indicate that a particular robotic device (or type of robotic device) has light emitters affixed to any suitable number of locations of the robotic device. The specification may indicate a distance between light emitters, a color associated with light produced by particular emitter(s), a shape associated with a light produced by particular emitter(s), a relative size of particular light data points (e.g., relative to one another), types and/or attributes associated with motion vectors to be provided, or the like. The projection module 804 may be configured to utilize a locally-stored (or remotely-obtained) specification to stimulate one or more components of a robotic device (e.g., one or more light emitters) to produce light information (e.g., light information projected on an identified projection area).

In at least one example, the projection module 804 may be further configured to obtain a specification associated with another robotic device (or a number of robotic devices). As a non-limiting example, the projection module 804 may be configured to identify one or more robotic devices (e.g., a number of robotic devices within a threshold distance with respect to a task location, a number of robotic devices to be utilized for a particular coordinate task (e.g., packaging, simultaneously moving an object, etc.), and the like), The projection module 804 may identify the one or more robotic devices utilizing the set of instructions received from the management module 15, from sensor data (e.g., camera(s), motion detector(s), etc.), or from any suitable information. Once the one or more robotic devices are identified, the projection module 804 may be configured to request specification information (e.g., a specification identifier, a specification, etc.) from, for example, the management module 15. The projection module 804 may further be configured to provide any suitable specification information to the coordination module 806 discussed below and/or a storage location suitable for storing such information.

In at least one embodiment, the projection module 804 may be configured to receive light information from a component of a robotic device (e.g., a camera). The projection module 804 may further be configured to provide light information and/or specification information to any suitable component of the robotic device management module 620 (e.g., the coordination module 806).

In at least one embodiment, the sensing module 805 may be configured to receive light information from the projection area (e.g., via a camera or other sensor of the robotic device). The sensing module 805 may be configured to perform operations to interpret and/or translate light information into current and/or planned motion information. For example, the sensing module 805 may utilize light information over time to calculate motion information for a particular robotic device. By way of example, the sensing module 805 may receive light information at time 1 and may identify (e.g., utilizing the specification for the corresponding robotic device) that particular portions of the robotic device are indicated by particular portions (e.g., light points) of the light information. Additionally, the sensing module 805 may receive light information for the robotic device at time 2 (e.g., a time period after time 1). The light information at time 2 may be processed by the sensing module and current and/or planned speed, direction, acceleration, orientation, location, or any suitable current/planned motion information may be calculated by the sensing module 805 utilizing the light information received at time 1 and/or at time 2. In at least one example, the sensing module 805 may provide the calculated current and/or planned motion information to any suitable module of the robotic device management module 620 (e.g., the coordination module 806).

Additionally, or alternatively, the sensing module 805 may be configured to interpret/extract motion information such as motion vectors from the light information provided at time 1 and/or at time 2. As a non-limiting example, the sensing module 805 may identify a motion vector (e.g., one or more arrows, lines, points, etc.) of the light information. In some examples the sensing module 805 may utilize the specification corresponding to the source of the light information (e.g., a robotic device) to identify and/or interpret one or more motion vectors of the light information. Once identified, the sensing module 805 may interpret the identified motion vectors to provide current and/or planned motion information to any suitable module of the robotic device management module 620 (e.g., the coordination module 806).

As a non-limiting example of the operations performed by the sensing module 805, the sensing module 805 may utilize specification information (e.g., a specification related to a robotic device associated with the received light information) to identify particular locations and/or portions of the robotic device that correspond with particular light data points of the light information. For example, attributes associated with a particular light emitter of the robotic device may be determined from the specification. Such attributes may be compared to the received light information to identify a location/portion of the robotic device. By way of example, the specification may indicate that a blue light is emitted from a particular location of a forearm of a robotic arm. The sensing module 805 may be configured to identify a light data point of the light information that indicate a blue light emission. Accordingly, the sensing module 805 may associate the particular light data point with the location of the forearm.

In some embodiments, upon determining the correlation between light data points and specific emitters of the robotic device, the sensing module 805 may perform various calculations to determine motion information associated with the robotic device. For example, the sensing module 805 may determine (based on a point of reference of the projection area) a distance and/or location of the robotic device based on a size associated with a particular light data point. In a non-limiting example, the specification may indicate that the light data point should be a particular size x when emitted from a particular distance y from the projection area. Accordingly, the actual size of the light data point (e.g., a diameter, a circumference, etc.) may be determined and compared to the specification to calculate an actual distance of the robotic device from the projection area.

In at least one embodiment, the sensing module 805 may be configured to determine some motion information (e.g., speed, direction, acceleration, etc.) over a time period utilizing one or more projections. For example, the sensing module 805 may utilizing light information projected by the projecting device at time 1 and light information projected by the device at time 2 to calculate a speed, direction, acceleration, or any suitable motion information of the projecting device.

In at least one embodiment, the sensing module 805 may be configured to determine an orientation of the robotic device within a three-dimensional physical space. For example, the identified light data points may be analyzed to determine that a robotic arm is bent at an angle of 60%. The size of respective light data points may be utilized as a whole to determine that the robotic arm is angled away from the projection area. The angle of the robotic arm with respect to the projection area may be calculated based on determining that certain light emitters (e.g., corresponding to certain light data points) are closer to the projection area while other light emitters (e.g., corresponding to other light data points) are farther away from the projection area. In accordance with at least one embodiment, the sensing module 805 may utilize the distance calculations associated with the various light data points to determine a location within the storage facility corresponding to the robotic device.

In some examples, the sensing module 805 may further be configured to determine a speed at which the robotic arm is moving by comparing locations of previous light data points to subsequently detected locations of the same light data points. A distance traveled may, for example, be divided by a time between detections and a speed may be calculated accordingly.

In at least one embodiment, the sensing module 805 may determine (e.g., according to a specification associated with the projecting device) that the light information includes a motion vector. The sensing module 805 may extract and/or interpret the motion vector according to one or more rules of the specification. By way of example, the specification may indicate that current motion information of the robotic device will be depicted in red, while planned motion information of the robotic device will be depicted in blue. Accordingly, the sensing module 805 may calculate the current and planned motion information from the corresponding red and blue light points. As another example, the specification may indicate that the motion vector to be included in the light information of a projecting device will include an arrow that indicates planned motion information. Accordingly, the sensing module 805 may identify the motion vector (e.g., an arrow) and interpret the motion information (e.g., speed, direction, acceleration, orientation, location, etc.) according to the specification.

In at least one embodiment, the coordination module 806 may be configured to receive motion information, current and/or planned, from the sensing module 805. The coordination module 806 may further be configured to perform various computations related to determining conflict information (e.g., indicating a conflict of space with another robotic device) associated with a particular robotic device.

In at least one embodiment, the coordination module 806 may be configured to calculate conflict information associated with the first robotic device and at least one other robotic device. For example, the coordination module 806 may determine (or request from management module 15) a set of instructions associated with the second robotic device. The set of instructions may indicate planned motions/actions of the second robotic device in accordance with its corresponding task. In some examples, the coordination module 806 may be configured access a set of instructions of the first robotic device (e.g., via the tasking module 802 or by accessing a data store configured to store such information). The coordination module 806 may further be configured to determine the manned motions of the first robotic device according to the set of instructions associated with its assigned task. In at least one embodiment, the planned motions of the first robotic device may be compared to the planned motions of the second robotic device and conflicts may be identified. Conflict information identifying various attributes of the conflict (e.g., a location associated with the conflict, a time of the potential conflict, a priority associated with the respective tasks of the robotic devices, etc.) may be communicated to the remedial action module 808. Such conflict information may be utilized by the remedial action module 808 to determine a suitable resolution to avoid the conflict.

The coordination module 806 may further be configured to determine potential conflicts associated with an operational overlap area of multiple robotic devices. For example, current and/or planned motion information associated with a local robotic device may be compared to current and/or planned motion information of another robotic device (e.g., as provided by the sensing module 805) to determine that the robotic devices will likely contend for a same space at substantially a same time. In at least one embodiment, the coordination module 806 may determine a threshold probability (e.g., a 90% likelihood, greater or equal to a 75% likelihood, etc.) that one or more robotic devices may attempt to access a same space at substantially a same time (e.g., or within a threshold time period such as within 1 second, 1 minute, etc.). Upon determining some likelihood that the robotic device will contend for a same space at substantially a same time, the coordination module 806 may be configured to stimulate the remedial action module 808 to determine a remedial action to perform to resolve the potential contention.

In at least one embodiment, the coordination module 806 may be further configured to coordinate a common task between multiple robots. For example, the set of instructions received by the tasking module 802 may indicate that a first robotic arm and a second robotic arm are to move an item in a particular manner (e.g., simultaneously lift the item and move it to a second location while both robotic devices maintain physical contact with the item for at least a portion of the task execution). The coordination module 806 may stimulate the first robotic device to provide corresponding light information by way of a projection area (e.g., utilizing the projection module 804). The sensing module 805 may be configured to receive sensor data of the first robotic device. The sensor data may indicate measurements of motion, speed, direction, elevation changes, and the like that is collected by a sensor affixed to the first robotic device. In at least one example, the sensor data may correspond to the robotic device or another object, such as the item being moved by the robotic arms, or any suitable object for which sensors of the robotic device are able to sense. Light information for the second robotic device may be received by the sensing module 805, the light information being collected by a sensor of the first robotic device. The sensing module 805 may process the sensor data of the first robotic device and/or the light information projected by the second robotic device to provide current/planned motion information of the first and the second robotic devices. The sensor data (e.g., such as camera input of the first robotic device) may be further utilized to determine motion information associated with the item. The sensing module 805 may provide motion information of the first robotic device and/or the second robotic device and/or the item to the coordination module 806. The motion information for each the first robotic device, the second robotic device, and the item may be analyzed by the coordination module 806 for potential issues. In at least one example, the coordination module 806 may receive and/or calculate an expected set of motions for the item based on the task. In some examples, the expected motion of the item is provided by the sensing module 805. The coordination module 806 may be configured to compare the expected set of motions to actual motions such as indicated in the sensor data related to the item. The coordination module 806 may further determine that the actual motion of the item is contrary to the current behavior of the second robotic device (e.g., as ascertained by the light information projected by the second robotic device). If the comparison indicates a deviation (e.g., over a threshold value) the coordination module 806 may provide such information to the remedial action module 808 for determination of a suitable action to take to return the item to the expected set of motions and/or to resolve the deviation (e.g., calculating a new expected path, causing one or both of the first robotic device and the second robotic device to perform an action, etc.).

In accordance with at least one embodiment, the remedial action module 808 may be configured to determine one or more remedial actions to perform in response to a determination that a contention between multiple robotic devices exists and/or a deviation from an expected path is occurring or has occurred. For example, the remedial action module 808 may receive contention information from the coordination module 806 as a result of a comparison between motion information of a first robotic device collected utilizing onboard motion sensors of the first robotic device and calculated motion information of a second robotic device calculated from light information provided by the second robotic device. The remedial action module 808, in some examples, may utilize the contention information (e.g., robot 1 and robot 2 will likely collide at location x at time y) to determine one or more remedial actions. The remedial action module 808 may be configured to consult locally-stored protocol sets to identify a predetermined remedial action (e.g., robot 1 reduce speed for a period of time, alter task execution in order to avoid the contended area, etc.).

In at least one embodiment, locally-stored protocol sets may be provided by the management module 15 and may include rules for performing particular remedial actions in response to particular stimuli (e.g., the attributes associated with the contention such as a number of robotic devices involved in the contention, motion information from onboard sensors of each robotic device, calculated motion information determined from light information provided by each robotic device, and the like). Such protocol sets may be computed (e.g., by the management module 15) based on previously-submitted conflict information and corresponding remedial actions taken. As a non-limiting example, the coordination module 806 and/or the remedial action module 808 may, upon completion of a task, at the end of a work day, or at any suitable time, provide conflict information and corresponding remedial actions taken in response to the conflict action to the management module 15. The management module 15 may analyze the data and score the remedial action according to a quantitative assessment as to the efficiency of the remedial action. For example, the management module 15 may determine an expected completion time of each task of the robotic devices and compare the expected completion time to an actual completion time. A efficiency score may be assigned to the remedial action according to the comparison. Accordingly, the management module 15 may generate a protocol set(s) for performing remedial actions based on the particular conflict information based on the efficiency score. As more conflict information is provided, the scores may be updated and the protocol sets may be regenerated and/or redistributed to the robotic devices.

In at least one embodiment, the remedial action module 808 may determine a priority associated with each task assigned to a corresponding robotic device involved in the contention and may identify a particular remedial action based on these priorities. As a non-limiting example, one robotic arm may be moving a fragile item (as determined by attributes associated with the item and obtained from the management module 15). Simultaneously another robotic arm may be in the process of removing a storage container of the item. The remedial action module 808 may determine that the movement of the fragile item is a higher priority task and may accordingly, enable the corresponding robotic arm to continue moving the fragile item and may further cause the other robotic arm associated with the lower priority task to wait to remove the storage container until the item/robotic arm is no longer occupying the contended space.

In at least one embodiment, the communication interface module 810 may facilitate communication between robotic device management module 620 and other components of inventory system 10 (e.g., the management module 15, other robotic device management modules operating on individual robotic devices, etc.), including receiving/transmitting task instructions, receiving/transmitting specification requests and or specification information, receiving sensor data from one or more components of a robotic device, transmitting instructions for providing light information by one or more emitters, receiving light information and/or other sensor data from one or more sensors of a robotic device, and the like. These communications discussed may represent communication of any form appropriate based on the capabilities of robotic device management module 620 and may include any suitable information. Depending on the configuration of robotic device management module 620, communication interface module 810 may be responsible for facilitating either or both of wired and wireless communication between robotic device management module 620 and the various components of inventory system 10. In particular embodiments, robotic device management module 620 may communicate using communication protocols such as 802.11, Bluetooth, or Infrared Data Association (IrDA) standards. Furthermore, robotic device management module 620 may, in particular embodiments, represent a portion of mobile drive unit 20, a portion of the robotic arm(s) 606 or other components of inventory system 10. In such embodiments, communication interface module 810 may facilitate communication between robotic device management module 620 and other parts of the same system component.

In at least one embodiment, the communication interface module 810 may be configured to manage a communication protocol between robotic devices. For example, the communication interface module 810 may be configured to request specification information from another robotic device directly. Additionally, or alternatively, the communication interface module 810 may receive a requested specification and may forward the received specification to the projection module 804 for processing. In at least one example, the communication interface module 810 may transmit/receive various data message to/from another robotic device. By way of example, the communication interface module 810 may receive a data message from another robotic device (e.g., a "leader" device) indicating a start time of a coordinated task. The start time may be, in some examples, forwarded to the tasking module 802 in order to modify the set of instructions associated with task execution (e.g., modify the start time). Accordingly, the tasking module 802 may subsequently stimulate performance of the task.

In general, the tasking module 802, the projection module 804, the coordination module 806, the remedial action module 808, and the communication interface module 810 may each represent any appropriate hardware and/or software suitable to provide the described functionality. In addition, as noted above, robotic device management module 620 may, in particular embodiments, represent multiple different discrete components and any or all of the tasking module 802, the projection module 804, the coordination module 806, the remedial action module 808, and the communication interface module 810 may represent components physically separate from the remaining elements of robotic device management module 620. Moreover, any two or more of the tasking module 802, the projection module 804, the coordination module 806, the remedial action module 808, and the communication interface module 810 may share common components.

Figure 9:
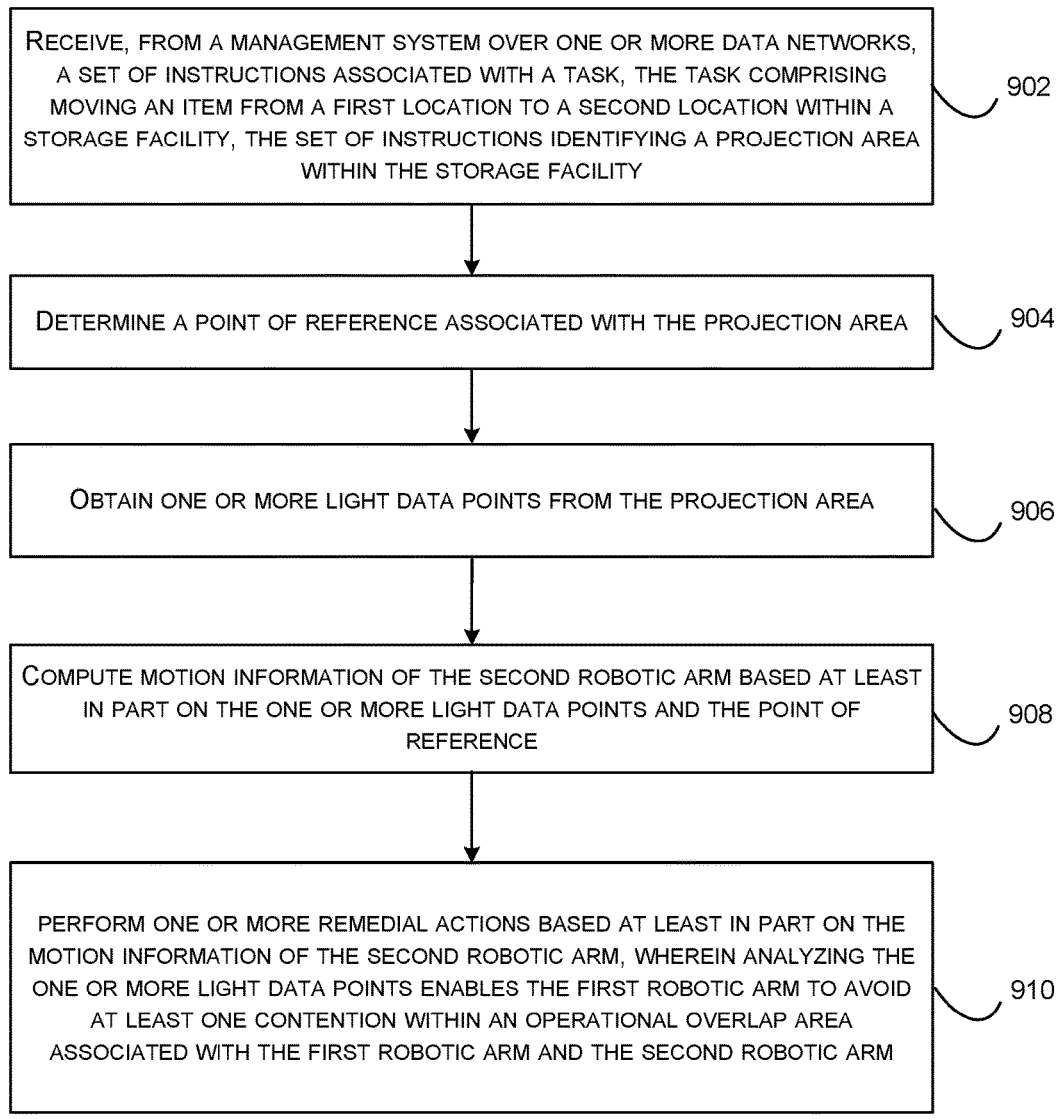
FIG. 9 is a flowchart illustrating an example method for providing a remedial action by the robotic device management module, in accordance with at least one embodiment.

FIG. 9 is a flowchart illustrating an example method 900 for providing a remedial action by the robotic device management module (e.g., the robotic device management module 620 of FIG. 6), in accordance with at least one embodiment. The method may be performed by a system (e.g., the inventory system 10 of FIG. 1, the system 1100 of FIG. 11, etc.) comprising a one or more data networks, one or more processors, a management system comprising a first set of memories storing computer-readable instructions and a first set of processors, a first robotic arm and a second robotic arm, the first robotic arm and the second robotic arm individually comprising a set of light emitters and a second set of memories storing second computer-readable instructions that, upon execution by a second set of processors, cause the first robotic arm to at least to perform the method 900.

The method may being at block 902, where a set of instructions associated with a task may be received over one or more data networks. In at least one embodiment the set of instructions may be received (e.g., by the tasking module 802 of FIG. 8) from a management module (e.g., the management module 15 of FIG. 3). In at least one example, the task may comprise moving an item (e.g., a single item, a group of items, a storage container, a storage container storing one or more items, etc.) from a first location to a second location within the storage facility. In at least one embodiment, the set of instructions identify a projection area within the storage facility.

At block 904, a point of reference may be determined (e.g., by the projection module 804 of FIG. 8). The point of reference, in some examples, may be associated with the projection area. At block 906, one or more light data points (e.g., light information) may be obtained from the projection area (e.g., received by the sensing module 805 of FIG. 8).

At block 908, motion information of the second robotic arm may be computed (e.g., by the sensing module 805 of FIG. 8). The motion information may be based at least in part on the one or more light data points and the point of reference. In at least one example, the motion information may be utilized by a component of the robotic device management module 620 (e.g., the coordination module 806) to determine that a contention exists/will occur for which a remedial action is needed.

At block 910, one or more remedial actions may be performed (e.g., by the remedial action module 808 and/or the tasking module 802 of FIG. 8). The one or more remedial actions may be performed (and/or determined) based at least in part on the motion information of the second robotic arm. In some examples, analyzing the one or more light data points enables the first robotic arm to avoid at least one contention within an operational overlap area associated with the first robotic arm and the second robotic arm.

Figure 10:
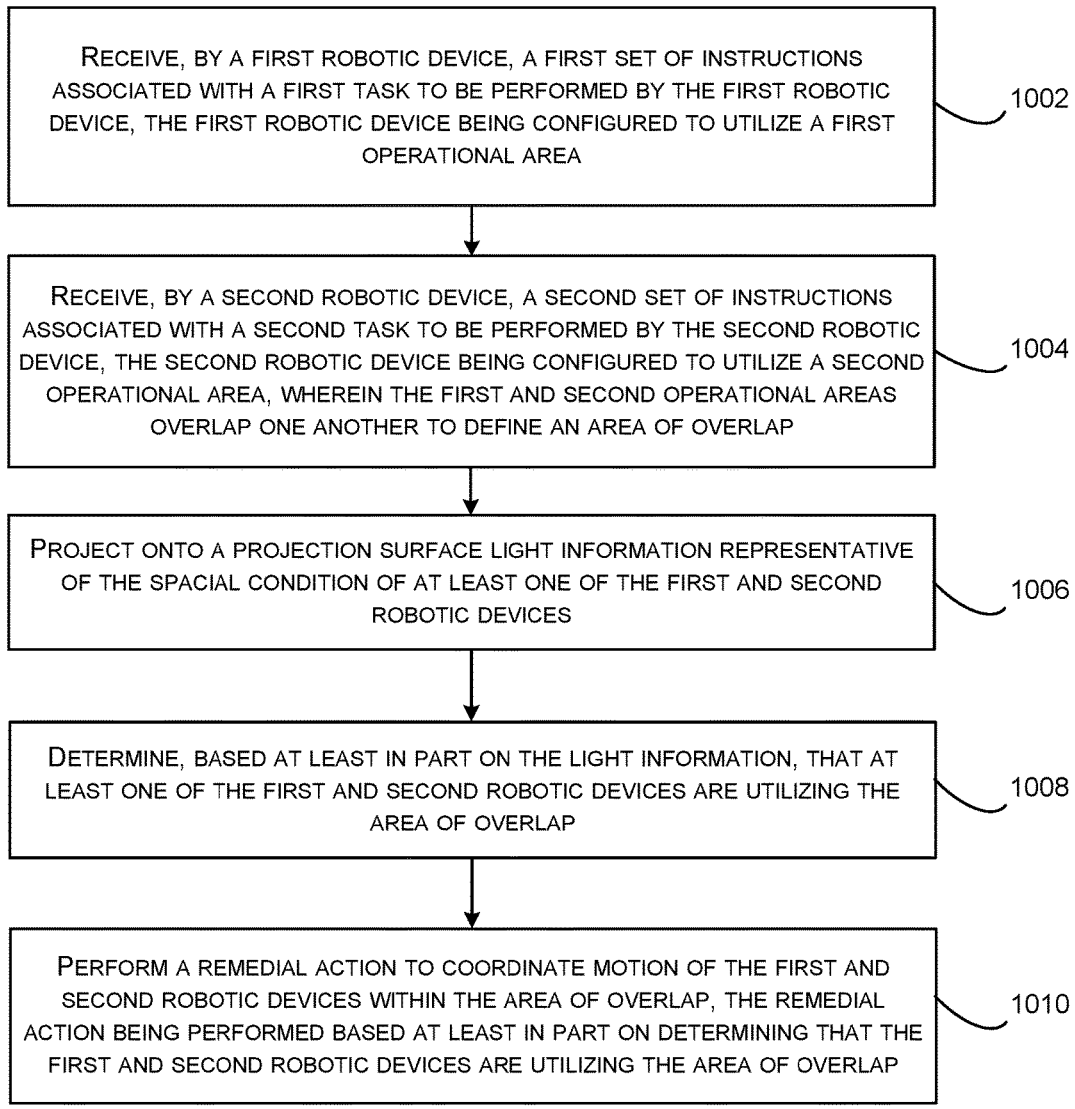
FIG. 10 is a flowchart illustrating another example method for providing a remedial action by the robotic device management module, in accordance with at least one embodiment.

FIG. 10 is a flowchart illustrating another example method 1000 for providing a remedial action by the robotic device management module (e.g., the robotic device management module 620 of FIG. 8), in accordance with at least one embodiment. The method may begin at block 1002, where a first set of instructions associated with a first task to be performed by the first robotic device may be received by the first robotic device (e.g., by the tasking module 802 of FIG. 8). In at least one example, the first robotic device may be tasked with moving an item within the storage facility from a first location to a second location.

At block 1004, a second set of instructions associated with a second task to be performed by the second robotic device may be received by the second robotic device (e.g., by the tasking module 802). In some examples, the second robotic device may be configured to utilize a second operational area. In at least one embodiment, the first and second operational areas may overlap one another to define an area of overlap.

At block 1006, light information representative of a spacial condition of at least one of the first and second robotic devices may be projected (e.g., by the projection module 804 of the first and/or second robotic devices) onto a projection surface (e.g., a wall, the ceiling, the floor, a projection screen, etc. of the storage facility). In at least one embodiment, the spacial condition may correspond to motion information of either/or the first and second robotic devices within the storage facility. In some examples, the spacial condition may correspond to current and/or planned motion information of the first robotic device and/or current and/or planned motion information of the second robotic device.

At block 1008, it may be determined (e.g., by the coordination module 806 of FIG. 8), based at least in part on the light information, that at least one of the first and second robotic devices are utilizing the area of overlap. In some examples, the coordination module 806 may determine, based at least in part on the light information, that the current and/or planned actions of the first robotic device and the second robotic device will conflict. For example, the coordination module 806 may determine that the first robotic device and the second robotic device will contend or are contending for a same area at substantially a same time.

At block 1010, a remedial action may be performed to coordinate motion of the first and second robotic devices within the area of overlap. In at least one example, the remedial action may be performed (e.g., by the remedial action module 808, by the tasking module 802, or any suitable module of the robotic device management module 620) based at least in part on determining that the first and second robotic devices are utilizing the area of overlap (e.g., as determined by the coordination module 806). In at least one embodiment, performance of the remedial action avoids, with respect to performance of the first task of the first robotic device and the second task of the second robot device, conflict/contention between the first robotic device and the second robotic device. In some examples, the conflict between the first robotic device and the second robotic device may indicate a potential collision between the first robotic device and the second robotic device. In at least one example, the first task of the first robotic device and the second task of the second robotic device may relate to a common task, such as coordinating movement of an item (e.g., lifting a box onto a storage container) as a coordinated effort of the first and second robotic devices. Accordingly, the remedial action may be performed to coordinate execution of the common task between the first and the second robotic devices.

Figure 11:
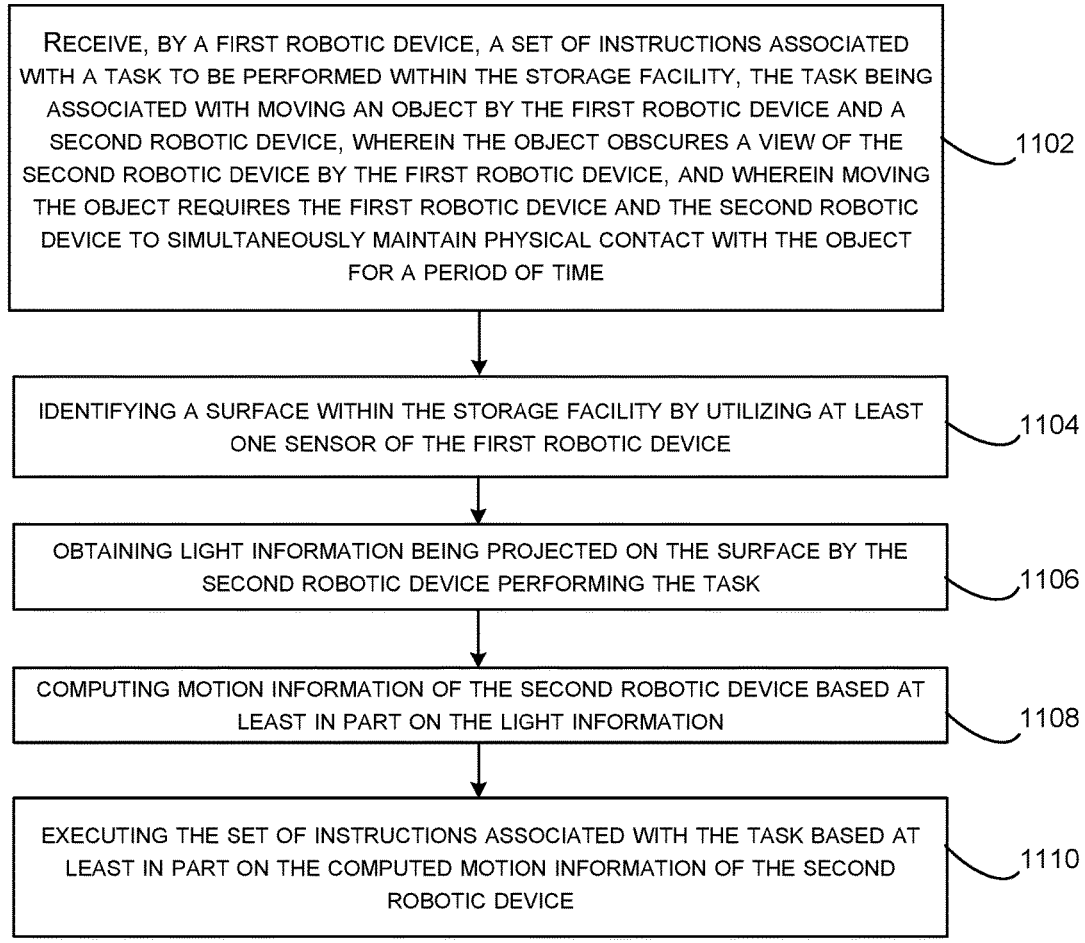
FIG. 11 is a flowchart illustrating still one further example method for providing a remedial action by the robotic device management module, in accordance with at least one embodiment, in accordance with at least one embodiment.

FIG. 11 is a flowchart illustrating still one further example method 1100 for providing a remedial action by the robotic device management module (e.g., the robotic device management module 620 of FIG. 6), in accordance with at least one embodiment. The method 1000 may be performed by one or more processors of a first robotic device. The method 1100 may begin at block 1102 where a set of instructions associated with a task to be performed within the storage facility may be received by the first robotic device (e.g., utilizing the tasking module 803 of FIG. 8). In at least one example, the task may be associated with moving an object by the first robotic and a second robotic device. In at least one embodiment, the object may obscure a view of the second robotic device by the first robotic device. In some embodiments, moving the object may require the first robotic device and the second robotic device to simultaneously maintain physical contact with the object for a period of time At block 1104, a surface within the storage facility may be identified by utilizing at least one sensor of the first robotic device. For example, the projection module 804 of FIG. 8 may be utilized to stimulate one or more sensors of the first robotic device (e.g., a location sensor, a camera, etc.) to obtain sensor data. Utilizing the sensor data received, the projection module 804 may determine the location of the surface with respect to the first robotic device.

At block 1106, light information being projected on the surface by the second robotic device performing the task may be obtained. In at least one embodiment, the light information may be obtained by the projection module 804 (e.g., utilizing a camera of the first robotic device).

At block 1108, motion information of the second robotic device may be computed based at least in part on the light information. In at least one embodiment, the motion information may be computed by the coordination module 806 of FIG. 8.

At block 1110, the set of instructions associated with the task may be executed based at least in part on the computed motion information of the second robotic device.

Figure 12:
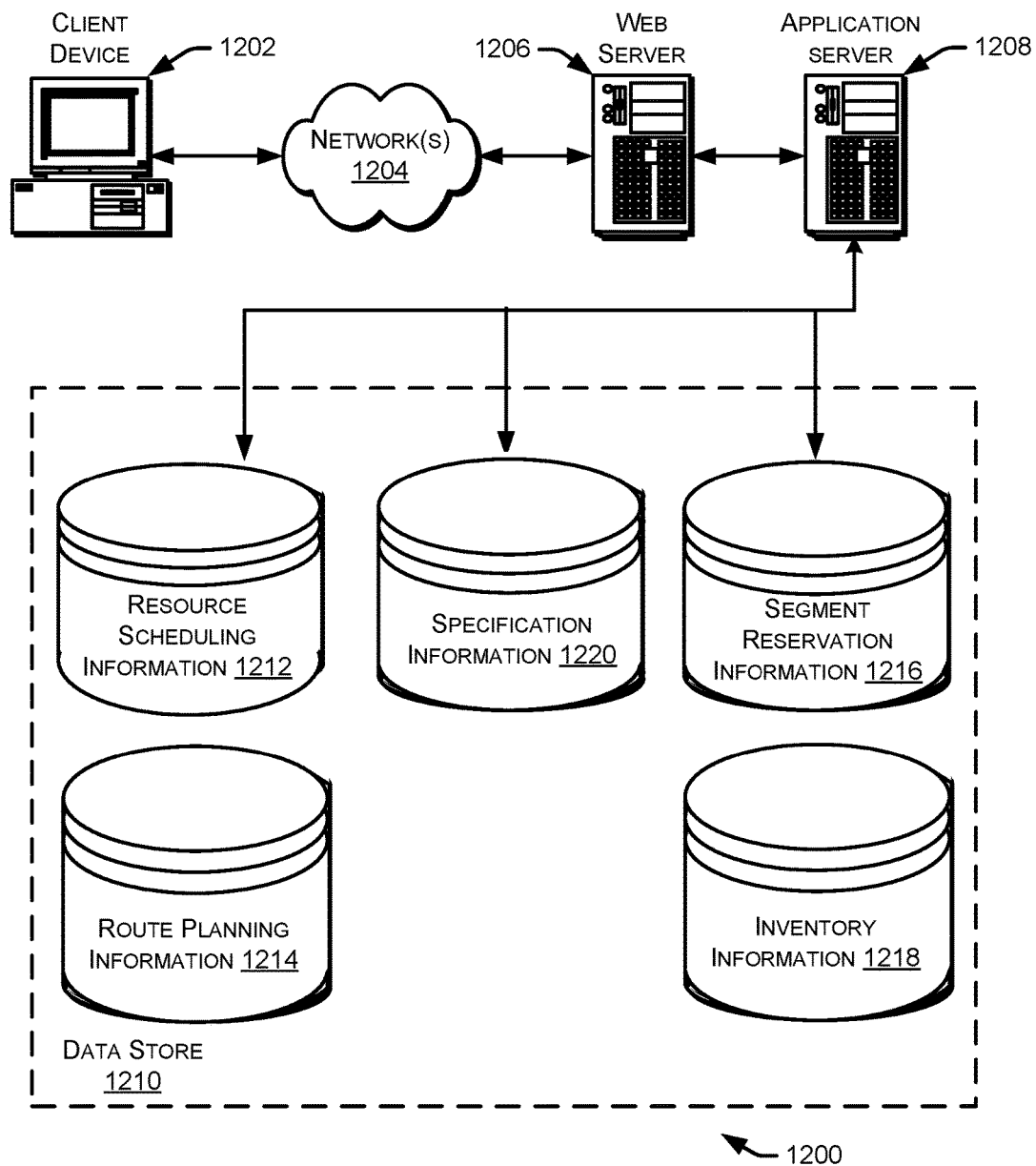
FIG. 12 is a schematic diagram illustrating an example environment for implementing aspects in accordance with at least one embodiment described herein.

FIG. 12 illustrates aspects of an example environment 1200 for implementing aspects in accordance with various embodiments. As will be appreciated, although a Web-based environment is used for purposes of explanation, different environments may be used, as appropriate, to implement various embodiments. The environment includes an electronic client device 1202, which can include any appropriate device operable to send and receive requests, messages, or information over an appropriate network 1204 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the electronic client device 1202 and the application server 1208, can be handled by the Web server. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing information which can be used by modules described herein, such as resource scheduling information 1212, route planning information 1214, segment reservation information 1216, inventory information 1218, and/or specification information 1220. It should be understood that there can be many other aspects that may need to be stored in the data store 1210. The data store 1210 is operable, through logic associated therewith, to receive instructions from the application server 1208 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the environment 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk®. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets)

or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An inventory system, comprising:
   one or more data networks;
   a management system comprising a first set of memories storing computer-readable instructions and a first set of processors; and
   a first robotic arm and a second robotic arm, the first robotic arm and the second robotic arm individually comprising a set of light emitters and a second set of memories storing second computer-readable instructions that, upon execution by a second set of processors, cause the first robotic arm to at least:
      receive, from the management system over the one or more data networks, a set of instructions associated with a task, the task comprising moving an item from a first location to a second location within a storage facility, the set of instructions identifying a projection area within the storage facility;
      determine a point of reference associated with the projection area;
      obtain one or more light data points from the projection area;
      compute motion information of the second robotic arm based at least in part on the one or more light data points; and
      perform one or more remedial actions based at least in part on the computed motion information of the second robotic arm, wherein analyzing the one or more light data points enables the first robotic arm to avoid at least one contention within an operational overlap area associated with the first robotic arm and the second robotic arm.

2. The inventory system of claim 1, wherein individual light data points correspond to a location of a particular portion of the second robotic arm.

3. The inventory system of claim 1, wherein the motion information of the second robotic arm comprises at least one of a location of the second robotic arm, an orientation corresponding to a portion of the second robotic arm, a motion measurement of the second robotic arm, or a distance measurement of the second robotic arm with respect to the point of reference associated with the projection area.

4. The inventory system of claim 1, wherein the first robotic arm and the second robotic arm are adjacent to one another within a conveyor belt system.

5. A computer-implemented method, comprising:
- receiving, by a first robotic device, a first set of instructions associated with a first task to be performed by the first robotic device, the first robotic device being configured to utilize a first operational area, the first robotic device having a set of light emitters;
- receiving, by a second robotic device, a second set of instructions associated with a second task to be performed by the second robotic device, the second robotic device being configured to utilize a second operational area, wherein the first and second operational areas overlap one another to define an area of overlap;
- projecting, by the first robotic device utilizing the set of light emitters, onto a projection surface a plurality of light data points representative of a spatial condition of the first robotic device;
- obtaining by the second robotic device, one or more of the plurality of light data points from the projection surface;
- computing, by the second robotic device, motion information of the first robotic device based at least in part on the one or more of the plurality of light data points;
- determining, by the second robotic device, based at least in part on the motion information, that the first robotic device is utilizing the area of overlap; and
- performing, by the second robotic device, a remedial action to coordinate motion of the first and second robotic devices within the area of overlap, the remedial action being performed based at least in part on determining that the first robotic device is utilizing the area of overlap.

6. The computer-implemented method of claim 5, wherein the remedial action comprises at least one of modifying the second set of instructions, halting motion of the second robotic device, reducing speed of the second robotic device, causing the first robotic device to halt motion or to change position, requesting a different task, or executing a different task.

7. The computer-implemented method of claim 5, further comprising:
- receiving task information associated with the second task corresponding to the second robotic device; and
- determining potential spatial conditions of the second robotic device based at least in part on the task information, wherein the remedial action is based at least in part on the potential spatial conditions of the second robotic device.

8. The computer-implemented method of claim 5, further comprising determining, based at least in part on the motion information, that a planned motion of the first robotic device will conflict with the planned motion of the second robotic device, the planned motion of the second robotic device being based at least in part on the second set of instructions.

9. The computer-implemented method of claim 5, wherein the set of lights emitters are affixed to the first robotic device.

10. The computer-implemented method of claim 5, wherein an attribute of the plurality of light data points differs in at least one of a color, a size, or a shape, and wherein the remedial action is based at least in part on a specific value for the attribute.

11. The computer-implemented method of claim 5, wherein computing the motion information of the first robotic device comprises:
- obtaining, by the second robotic device, a specification associated with the first robotic device, the specification identifying an expected light pattern that specifies attributes of a set of light data points that correspond to particular portions of the first robotic device; and
- identifying particular light data points of the plurality of light data points that correspond to the particular portions of the first robotic device based at least in part on the specification.

12. The computer-implemented method of claim 5, wherein computing the motion information of the first robotic device further comprises:
- obtaining a specification associated with the first robotic device, the specification identifying properties of a motion vector for identifying planned spatial conditions of the first robotic device;
- identifying one or more motion vectors from the one or more of the plurality of light data points; and
- computing a planned spatial condition of the first robotic device based at least in part on the specification and the one or more motion vectors.

13. The computer-implemented method of claim 5, further comprising:
- transmitting, by the second robotic device to a management system, a conflict resolution request based at least in part on determining that the first robotic device is utilizing the area of overlap;
- in response to the conflict resolution request, receiving, from the management system, a new set of instructions associated with execution of the second task; and
- executing the second task according to the new set of instructions.

14. The computer-implemented method of claim 5, further comprising:
- determining a first priority associated with the first task; and
- determining a second priority associated with the second task wherein the remedial action is based at least in part on the first priority and the second priority.

15. A computer-readable storage medium comprising computer-readable instructions that, upon execution by one or more processors of a first robotic device, cause the first robotic device to perform operations comprising:
- receiving, by the first robotic device, a set of instructions associated with a task to be performed within a storage facility, the task being associated with moving an object by the first robotic device and a second robotic device, wherein the object obscures a view of the second robotic device by the first robotic device, and wherein moving the object requires the first robotic device and the second robotic device to simultaneously maintain physical contact with the object for a period of time;
- identifying a surface within the storage facility by utilizing at least one sensor of the first robotic device;
- obtaining light information being projected on the surface by the second robotic device performing the task;
- computing motion information of the second robotic device based at least in part on the light information; and
- executing the set of instructions associated with the task based at least in part on the computed motion information of the second robotic device.

16. The computer-readable storage medium of claim 15, wherein the operations further comprise:

providing, by the first robotic device, additional light information on the surface, the additional light information corresponding to additional motion information of the first robotic device; and computing a distance measurement of the first robotic device with respect to the surface based at least in part on the additional light information, wherein the motion information of the second robotic device is based at least in part on the distance measurement of the first robotic device.

17. The computer-readable storage medium of claim 15, wherein the operations further comprise:

transmitting, to the second robotic device, a first specification associated with the first robotic device, the first specification indicating a first expected light pattern of the first robotic device; and receiving, from the second robotic device, a second specification associated with the second robotic device, the second specification indicating a second expected light pattern of the second robotic device, wherein the motion information of the second robotic device is computed based at least in part on the second specification associated with the second robotic device.

18. The computer-readable storage medium of claim 15, wherein the operations further comprise:

calculating an expected path of the object;

determining that the object deviated from the expected path and in a manner contrary to the motion information of the second robotic device; and performing a remedial action to return the object to the expected path.

19. The computer-readable storage medium of claim 15, wherein the operations further comprise:

providing the motion information to a remote processing system; and receiving, from the remote processing system, a set of protocols for performing remedial actions based at least in part on the motion information provided to the remote processing system.

20. The computer-readable storage medium of claim 15, wherein the operations further comprise:

receiving, from a remote processing system, a second specification associated with the second robotic device, the second specification indicating a second expected light pattern of the second robotic device, wherein the motion information of the second robotic device is computed based at least in part on the second specification associated with the second robotic device.

* * * * *